United States Patent
Guo et al.

(10) Patent No.: US 10,867,404 B2
(45) Date of Patent: Dec. 15, 2020

(54) DISTANCE ESTIMATION USING MACHINE LEARNING

(71) Applicant: Toyota Jidosha Kabushiki Kaisha, Toyota (JP)

(72) Inventors: Rui Guo, Mountain View, CA (US); Babajide Ayinde, Louisville, TX (US); Hao Sun, St. Louis, MO (US); Kentaro Oguchi, Menlo Park, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 185 days.

(21) Appl. No.: 16/116,417

(22) Filed: Aug. 29, 2018

(65) Prior Publication Data

US 2020/0074674 A1    Mar. 5, 2020

(51) Int. Cl.
*G06T 7/50* (2017.01)
*G06T 5/00* (2006.01)
(Continued)

(52) U.S. Cl.
CPC ............ *G06T 7/74* (2017.01); *G06K 9/00791* (2013.01); *G06K 9/6262* (2013.01); *G06T 5/008* (2013.01);
(Continued)

(58) Field of Classification Search
CPC ......... G06T 5/007; G06T 5/008; G06T 5/009; G06T 7/50; G06T 7/70; G06T 7/73;
(Continued)

(56) References Cited

U.S. PATENT DOCUMENTS

| 7,113,867 B1 | 9/2006 | Stein |
| 9,979,894 B1 * | 5/2018 | Kokennohr et al. ..... H04N 1/00 |

(Continued)

FOREIGN PATENT DOCUMENTS

CN     107578436 A    1/2018

OTHER PUBLICATIONS

Atapour-Abarghouei et al., "Real-Time Monocular Depth Estimation using Synthetic Data with Domain Adaptation via Image Style Transfer," IEEE Conference on Computer Vision and Pattern Recognition (CVPR), Salt Lake City, Utah, USA, Jun. 18-22, 2018, 11 pgs.

(Continued)

*Primary Examiner* — Andrew W Johns
(74) *Attorney, Agent, or Firm* — VLP Law Group, LLP

(57) ABSTRACT

A method receives a captured image depicting image content including an object, the captured image being captured by an image sensor located at a sensor position; generates, using a trained first machine learning logic, a lighting-corrected image from an imitative simulation image depicting at least a portion of the image content of the captured image in a simulation style associated with an environment simulator; generates, using a trained second machine learning logic, a depth estimation image from the lighting-corrected image, the depth estimation image indicating a relative distance between the object depicted in the captured image and the sensor position of the image sensor; and determines an object position of the object depicted in the captured image based on the depth estimation image.

13 Claims, 7 Drawing Sheets

(51) Int. Cl.
  *G06K 9/00* (2006.01)
  *G06T 7/73* (2017.01)
  *G06K 9/62* (2006.01)

(52) U.S. Cl.
  CPC ...... *G06T 7/50* (2017.01); *G06T 2207/20081* (2013.01); *G06T 2207/20084* (2013.01); *G06T 2207/30256* (2013.01); *G06T 2207/30261* (2013.01)

(58) Field of Classification Search
  CPC ............ G06T 7/74; G06T 2207/20081; G06T 2207/20084; G06T 2207/30252; G06T 2207/30261; G06K 9/00201; G06K 9/00208; G06K 9/00791; G06K 9/00805; G06K 9/4661; G06K 9/6262; G01B 11/22
  See application file for complete search history.

(56) References Cited

U.S. PATENT DOCUMENTS

| | | | |
|---|---|---|---|
| 2008/0137989 | A1 | 6/2008 | Ng et al. |
| 2017/0169620 | A1* | 6/2017 | Bleiweiss et al. .......................... G06K 9/00201 |
| 2019/0370666 | A1* | 12/2019 | Ros Sanchez et al. ...................... G06N 3/088 |

OTHER PUBLICATIONS

Goodfellow et al., "Generative Adversarial Nets," NIPS '14 Proceedings of the 27th International Conference on Neural Information Processing Systems, Dec. 8-13, 2014, Montreal, Canada, vol. 2, pp. 2672-2680.
Mirza et al., "Conditional Generative Adversarial Nets," arXiv:1411.1784, Nov. 6, 2014, 7 pgs.
A.I. Wiki, "A Beginner's Guide to Generative Adversarial Networks (GANs)," at least as early as Aug. 9, 2018, retrieved from https://skymind.ai/wiki/generative-adversarial-network-gan, 27 pgs.
Bruner et al., "Generative Adversarial Networks for beginners," Jun. 7, 2017, retrieved from https://www.oreilly.com/learning/generative-adversarial-networks-for-beginners, 10 pgs.
Colyer, "Image-to-image translation with conditional adversarial networks," May 8, 2018, retrieved from https://blog.acolyer.org/2018/05/08/image-to-image-translation-with-conditional-adversarial-networks/, 11 pgs.
Farique, "Cycle Generative Adversarial Networks," Aug. 4, 2018, retrieved from https://mc.ai/cycle-generative-adversarial-networks/,11 pgs.
Mirza et al., "Conditional GAN," Nov. 2014, retrieved from www1.idc.ac.il/toky/seminarIP-18/Presentations/10b_raaz.pdf, 61 pgs.
Murali, "GANs, a modern perspective," Oct. 7, 2017, retrieved from https://medium.com/deep-dimension/gans-a-modern-perspective-83ed64b42f5c, 15 pgs.
Shibuya, "Understanding Generative Adversarial Networks," Nov. 2, 2017, retrieved from https://towardsdatascience.com/understanding-generative-adversarial-networks-4dafc963f2ef, 13 pgs.

* cited by examiner

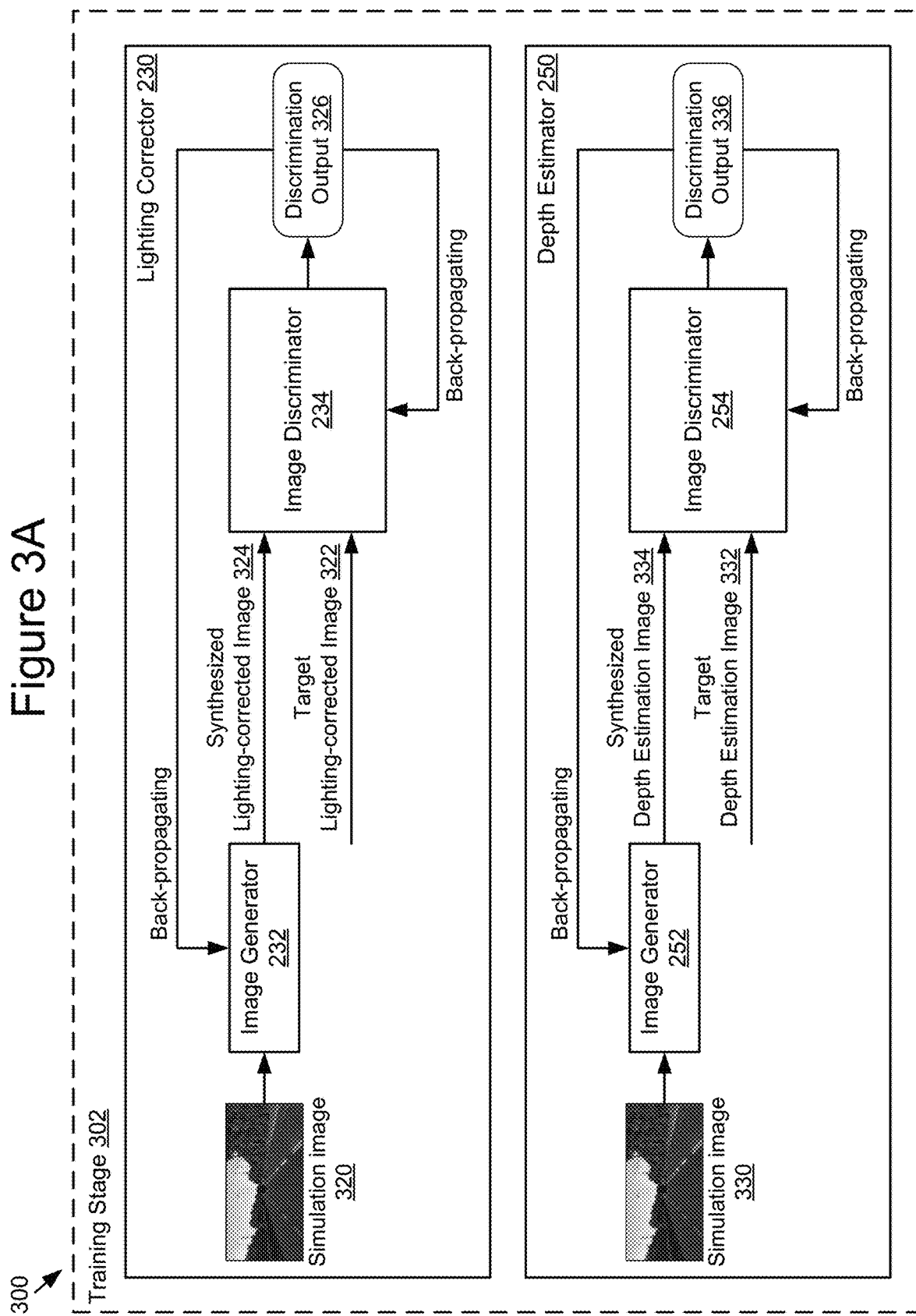

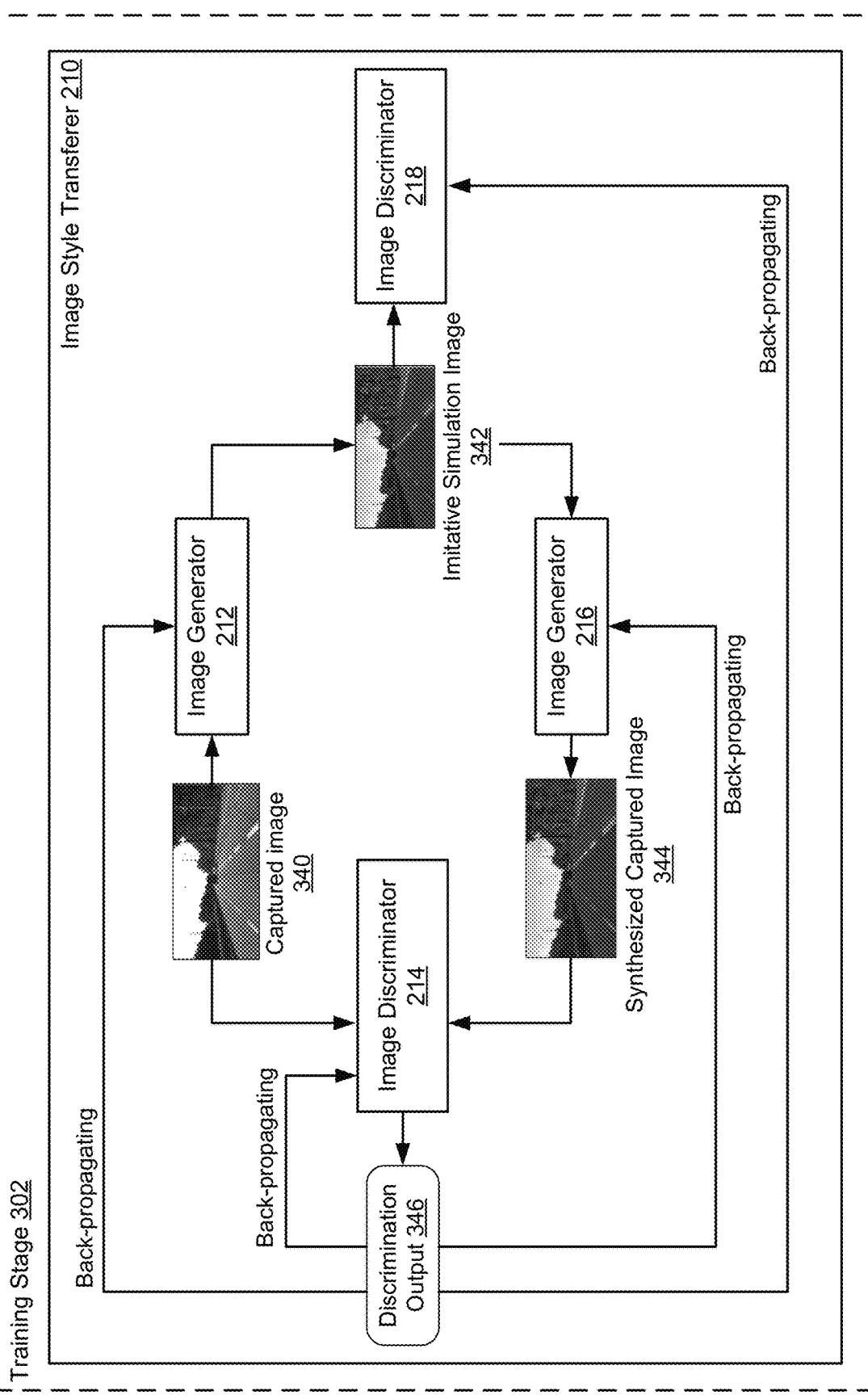

DISTANCE ESTIMATION USING MACHINE LEARNING

BACKGROUND

The present disclosure relates to determining positions of objects. In a more particular example, the disclosure relates to technologies for estimating relative distances of objects depicted in images using image processing.

Estimating relative distances of objects often requires depth estimation. Today, some modern systems often use training data that includes captured images and depth estimation images corresponding to the captured images for depth estimation training. However, creating this training data is usually time-consuming and computationally expensive, because of the massive amount of computation to process the captured images and generate the depth estimation images corresponding to these captured images. As a result, the depth estimation performed by these existing systems is usually inaccurate due to insufficient training caused by the limited amount of training data. Another existing solution is to use simulation images in training the systems to perform the depth estimation. However, as these systems are trained using the simulation images but generally applied to perform the depth estimation on the captured images, the accuracy of the depth estimation is significantly reduced. In addition, the existing systems are generally incapable of addressing ambient constraints in the images, and thus it is typically impractical or impossible for these systems to perform an accurate depth estimation on the captured images including these ambient constraints.

SUMMARY

The subject matter described in this disclosure overcomes the deficiencies and limitations of the existing solutions by providing novel technology for determining optimal merging maneuvers for merging vehicles to merge into mainline traffic.

According to one innovative aspect of the subject matter described in this disclosure, a method comprises: receiving a captured image depicting image content including an object, the captured image being captured by an image sensor located at a sensor position; generating, using a trained first machine learning logic, a lighting-corrected image from an imitative simulation image depicting at least a portion of the image content of the captured image in a simulation style associated with an environment simulator; generating, using a trained second machine learning logic, a depth estimation image from the lighting-corrected image, the depth estimation image indicating a relative distance between the object depicted in the captured image and the sensor position of the image sensor; and determining an object position of the object depicted in the captured image based on the depth estimation image.

In general, another innovative aspect of the subject matter described in this disclosure may be embodied in systems comprising: one or more processors; an environment simulator executable by the one or more processors to generate one or more simulation images; a first machine learning logic executable by the one or more processors to receive a captured image depicting image content including an object, the captured image being captured by an image sensor located at a sensor position, and generate an imitative simulation image from the captured image, the imitative simulation image depicting at least a portion of the image content of the captured image in a simulation style associated with the environment simulator; a second machine learning logic executable by the one or more processors to receive the imitative simulation image from the first machine learning logic, and generate a lighting-corrected image from the imitative simulation image; a third machine learning logic executable by the one or more processors to receive the lighting-corrected image from the second machine learning logic, and generate a depth estimation image from the lighting-corrected image, the depth estimation image indicating a relative distance between the object depicted in the captured image and the sensor position of the image sensor; and an object position calculator executable by the one or more processors to determine an object position of the object depicted in the captured image based on the depth estimation image.

In general, another innovative aspect of the subject matter described in this disclosure may be embodied in methods comprising: generating, using an environment simulator, a simulation image and a target lighting-corrected image corresponding to the simulation image, the simulation image depicting simulated image content and including a lighting effect, the target lighting-corrected image depicting the simulated image content and excluding or reducing the lighting effect; generating, using a first machine learning logic, a synthesized lighting-corrected image from the simulation image, the synthesized lighting-corrected image reducing or removing the lighting effect in the simulation image; determining, using the first machine learning logic, a first discrimination output indicating a level of similarity between the synthesized lighting-corrected image and the target lighting-corrected image; and adjusting one or more parameters of the first machine learning logic based on the first discrimination output.

In general, another innovative aspect of the subject matter described in this disclosure may be embodied in systems comprising: one or more processors; an environment simulator executable by the one or more processors to generate a simulation image and a target lighting-corrected image corresponding to the simulation image, the simulation image depicting simulated image content and including a lighting effect, the target lighting-corrected image depicting the simulated image content and excluding or reducing the lighting effect; a first machine learning logic executable by the one or more processors to generate a synthesized lighting-corrected image from the simulation image, the synthesized lighting-corrected image reducing or removing the lighting effect in the simulation image, and determine a first discrimination output indicating a level of similarity between the synthesized lighting-corrected image and the target lighting-corrected image; and a training engine executable by the one or more processors to adjust one or more parameters of the first machine learning logic based on the first discrimination output.

These and other implementations may each optionally include one or more of the following features: that the image content of the captured image depicts a road segment and the object depicted in the captured image is a roadway object associated with the road segment; that generating the lighting-corrected image from the imitative simulation image includes detecting, using the trained first machine learning logic, one or more of a shadow region and a glare region in the imitative simulation image, responsive to detecting the shadow region in the imitative simulation image, adjusting, using the trained first machine learning logic, the shadow region to reduce or remove a shadow in the shadow region of the imitative simulation image, and responsive to detecting the glare region in the imitative simulation image, adjusting, using the trained first machine learning logic, the glare region to reduce or remove a glare in the glare region of the imitative simulation image; that generating, using a trained third machine learning logic, the imitative simulation image from the captured image; that the image content of the captured image depicts a real environment including the object, the simulation style associated with the environment simulator includes a simulated color and a simulated texture generated by the environment simulator, and generating the imitative simulation image from the captured image includes adjusting, using the trained third machine learning logic, one or more of a captured color of the object and a captured texture of the object to one or more of the simulated color and the simulated texture; that generating the depth estimation image from the lighting-corrected image includes mapping, using the trained second machine learning logic, one or more image pixels in the lighting-corrected image to one or more grayscale pixels in the depth estimation image; that the trained first machine learning logic is a conditional-Generative Adversarial Network (GAN) and the trained second machine learning logic is another conditional-GAN, and that generating, using a trained third machine learning logic, the imitative simulation image from the captured image, the trained third machine learning logic being a cycle-GAN.

These and other implementations may each optionally include one or more of the following features: that the simulated image content of the simulation image depicts a simulated road segment including one or more simulated roadway objects; that generating the synthesized lighting-corrected image from the simulation image includes detecting, using the first machine learning logic, one or more of a shadow region and a glare region in the simulation image, responsive to detecting the shadow region in the simulation image, adjusting, using the first machine learning logic, the shadow region to reduce or remove a shadow in the shadow region of the simulation image, and responsive to detecting the glare region in the simulation image, adjusting, using the first machine learning logic, the glare region to reduce or remove a glare in the glare region of the simulation image; that generating, using the environment simulator, a target depth estimation image corresponding to the simulation image, the target depth estimation image indicating a relative distance between an object depicted in the simulation image and a simulated sensor position associated with the simulation image, generating, using a second machine learning logic, a synthesized depth estimation image from the target lighting-corrected image, the target lighting-corrected image depicting the simulated image content of the simulation image and excluding or reducing the lighting effect, determining, using the second machine learning logic, a second discrimination output indicating a level of similarity between the synthesized depth estimation image and the target depth estimation image, and adjusting one or more parameters of the second machine learning logic based on the second discrimination output; that generating the synthesized depth estimation image from the target lighting-corrected image includes mapping, using the second machine learning logic, one or more image pixels in the target lighting-corrected image to one or more grayscale pixels in the synthesized depth estimation image; that receiving a captured image depicting image content, the captured image being captured by an image sensor, generating, using a third machine learning logic, an imitative simulation image from the captured image, the imitative simulation image depicting at least a portion of the image content of the captured image in a simulation style associated with the environment simulator, generating, using the third machine learning logic, a synthesized captured image from the imitative simulation image, the synthesized captured image reproducing the captured image, determining, using the third machine learning logic, a third discrimination output indicating a level of similarity between the synthesized captured image and the captured image, and adjusting one or more parameters of the third machine learning logic based on the third discrimination output; that the image content of the captured image depicts a real environment including an object, the simulation style associated with the environment simulator includes a simulated color and a simulated texture generated by the environment simulator, generating the imitative simulation image from the captured image includes adjusting, using the third machine learning logic, one or more of a captured color of the object and a captured texture of the object to one or more of the simulated color and the simulated texture, and generating the synthesized captured image from the imitative simulation image includes adjusting, using the third machine learning logic, one or more of the simulated color of the object and the simulated texture of the object depicted in the imitative simulation image to one or more of the captured color of the object and the captured texture of the object depicted in the captured image.

Other implementations of one or more of these and other aspects include corresponding systems, apparatus, and computer programs, configured to perform the actions of methods, encoded on non-transitory computer storage devices.

The novel technology for performing depth estimation and determining the relative distance of objects based on the depth estimation presented in this disclosure is particularly advantageous in a number of respects. For example, the technology described herein is capable of performing monocular depth estimation. In particular, the present technology can generate a depth estimation image from a single monocular image captured by one image sensor, thereby eliminating the need to use multiple image sensors to capture multiple images from different perspectives and synthesize multiple captured images to perform the depth estimation. As a further example, the technology described herein uses simulation images generated by an environment simulator (e.g., a traffic simulator) for depth estimation training. Therefore, the present technology can be trained to perform the depth estimation with a massive number of high-resolution simulation images, and thus the accuracy of the depth estimation can be improved due to sufficient training with a large amount of training data.

The technology described herein is also particularly advantageous because it is capable of adjusting the captured images captured the by image sensors to the simulation style of the simulation images generated by the environment simulator. As a result, the present technology is advantageously applicable to perform the depth estimation on the captured images even if the present technology is previously trained with the simulation images. Furthermore, the present technology can effectively address the ambient constraints usually present in the captured images (e.g., shadows, glares, reflections, etc.), and thus the negative impacts of these ambient constraints on the accuracy of the depth estimation can be limited or avoided. In addition, the technology described herein may include multiple machine learning logics. These machine learning logics may be trained individually with the simulation images, and then implemented to perform the depth estimation on the captured images that are captured by the image sensors in real-time. This system structure enables the present technology to be implemented on vehicles, thereby providing the vehicles with the capability to determine the positions of various roadway objects and adapt their navigation paths accordingly.

It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

BRIEF DESCRIPTION OF THE DRAWINGS

FIGS. 3A-3C illustrates block diagrams of an example training stage and an example implementation stage of the distance estimating application.

DESCRIPTION

The technology described herein can perform accurate depth estimations and determine relative distances of objects based on the depth estimations. As described in further detail below, the present technology may include various aspects, such as distance estimating methods, systems, apparatuses, computing devices, computer program products, etc. It should be understood that while this present disclosure may describe the present technology in a vehicle-related context, the present technology may be applicable in other contexts, scenarios, and/or applications that require object localization.

An example distance estimating system may include multiple machine learning logics. In some embodiments, a first machine learning logic among these machine learning logics may be trained to generate an imitative simulation image from a captured image. The imitative simulation image may depict image content of the captured image that is captured by an image sensor in a simulation style associated with an environment simulator. In some embodiments, a second machine learning logic among the machine learning logics may be trained to generate a lighting-corrected image from the imitative simulation image. The lighting-corrected image may reduce or remove one or more lighting effects in the imitative simulation image (e.g., shadows, glares, reflections, etc.). In some embodiments, a third machine learning logic among the machine learning logics may be trained to generate a depth estimation image from the lighting-corrected image. The depth estimation image may map one or more image pixels in the lighting-corrected image to one or more grayscale pixels in the depth estimation image. In some embodiments, the gray intensity of these grayscale pixels in the depth estimation image may indicate a relative distance between an object depicted in the captured image and the sensor position of the image sensor.

Accordingly, in the implementation stage, the trained distance estimating system may receive a captured image captured by an image sensor. The trained distance estimating system may generate an imitative simulation image from the captured image using the trained first machine learning logic, generate a lighting-corrected image from the imitative simulation image using the trained second machine learning logic, and generate a depth estimation image from the lighting-corrected image using the trained third machine learning logic. As the depth estimation image may indicate the relative distance between an object depicted in the captured image and the sensor position of the image sensor, the trained distance estimating system may determine the object position of the object based on the depth estimation image. In some embodiments, the object position of the object may then be used to determine or update navigation paths for various vehicles.

Figure 1:
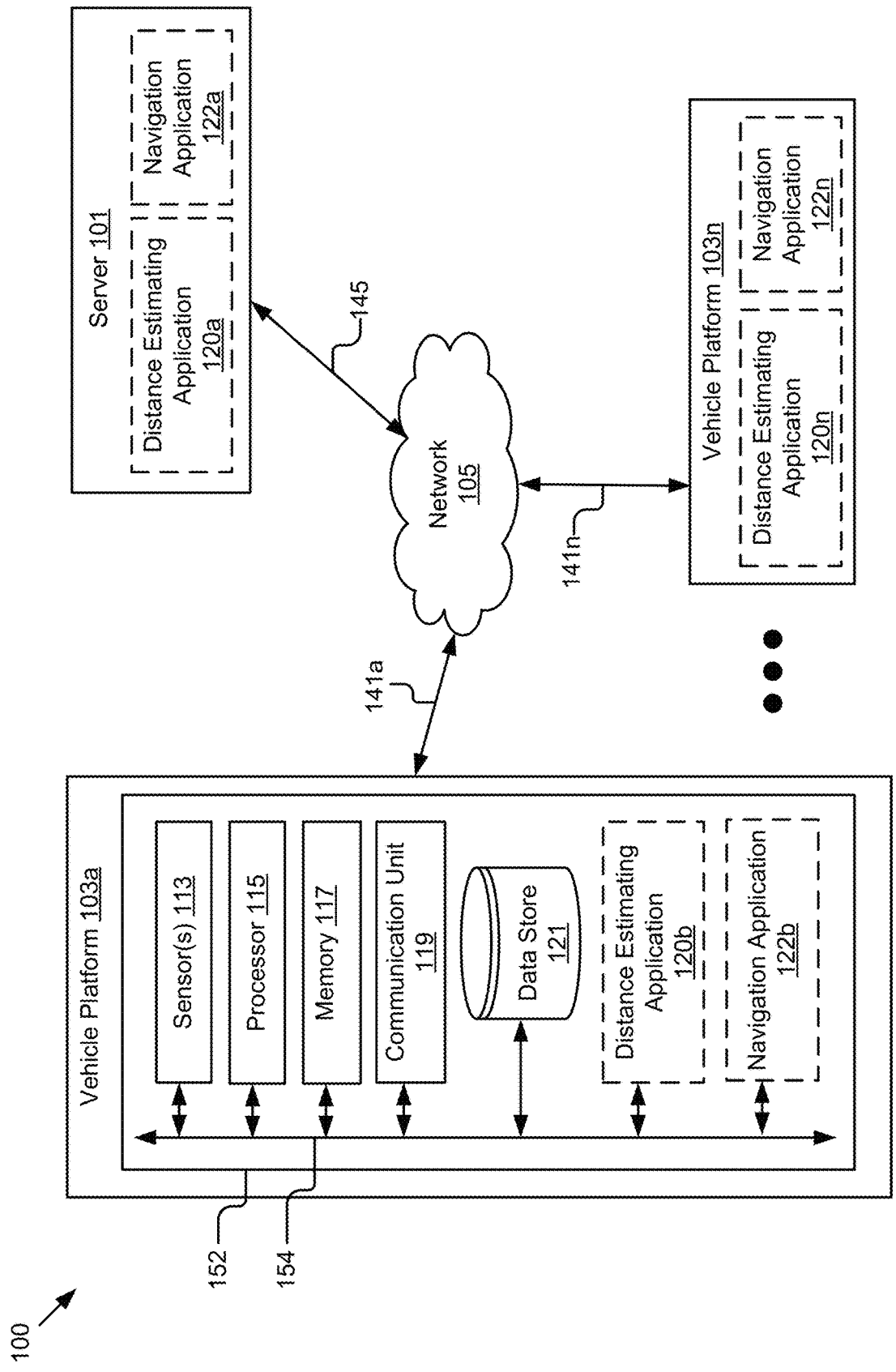
FIG. 1 is a block diagram of an example system for performing a depth estimation and determining a relative distance of an object based on the depth estimation.

FIG. 1 is a block diagram of an example system 100 for performing a depth estimation and determining a relative distance of an object based on the depth estimation. As shown, the system 100 includes a server 101 and one or more vehicle platforms 103*a* . . . 103*n* coupled for electronic communication via a network 105. In FIG. 1 and the remaining figures, a letter after a reference number, e.g., "103*a*," represents a reference to the element having that particular reference number. A reference number in the text without a following letter, e.g., "103," represents a general reference to instances of the element bearing that reference number. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of vehicle platforms 103 or servers 101.

The network 105 may be a conventional type, wired and/or wireless, and may have numerous different configurations including a star configuration, token ring configuration, or other configurations. For example, the network 105 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), vehicular networks, and/or other interconnected data paths across which multiple devices may communicate.

The network 105 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 105 is a wireless network using a connection such as DSRC (Dedicated Short Range Communication), WAVE, 802.11p, a 3G, 4G, 5G+ network, WiFi™, satellite networks, vehicle-to-vehicle (V2V) networks, vehicle-to-infrastructure/infrastructure-to-Page vehicle (V2I/I2V) networks, or any other wireless networks. Although FIG. 1 illustrates a single block for the network 105 that couples to the server 101 and the vehicle platform(s) 103, it should be understood that the network 105 may in practice comprise any number of combination of networks, as noted above.

The server 101 includes a hardware and/or virtual server that includes a processor, a memory, and network communication capabilities (e.g., a communication unit). The server 101 may be communicatively coupled to the network 105, as reflected by signal line 145. In some embodiments, the server 101 may send and receive data to and from other entities of the system 100 (e.g., the vehicle platform(s) 103). As depicted, the server 101 may include an instance 120a of a distance estimating application 120 and an instance 122a of a navigation application 122 as further discussed elsewhere herein.

The vehicle platform(s) 103 include computing device(s) 152 having sensor(s) 113, processor(s) 115, memory(ies) 117, communication unit(s) 119, a data store 121, a distance estimating application 120, and a navigation application 122. Examples of computing device(s) 152 may include virtual or physical computer processors, control units, micro-controllers, etc., which are coupled to other components of the vehicle platform(s) 103, such as one or more sensors 113, one or more actuators, one or more motivators, etc. The vehicle platform(s) 103 may be coupled to the network 105 via signal line 141, and may send and receive data to and from other vehicle platform(s) 103 and/or the server(s) 101. In some embodiments, the vehicle platform(s) 103 are capable of transporting from one point to another. Non-limiting examples of the vehicle platform(s) 103 include a vehicle, an automobile, a bus, a boat, a plane, a bionic implant, a robot, or any other platforms with non-transitory computer electronics (e.g., a processor, a memory or any combination of non-transitory computer electronics). The vehicle platform(s) 103 may be referred to herein as vehicle(s).

The processor(s) 115 may execute software instructions (e.g., tasks) by performing various input/output, logical, and/or mathematical operations. The processor(s) 115 may have various computing architectures to process data signals. The processor(s) 115 may be physical and/or virtual, and may include a single core or plurality of processing units and/or cores. In the context of the vehicle platform 103, the processor may be an electronic control unit (ECU) implemented in the vehicle platform 103 such as a car, although other types of platform are also possible and contemplated. The ECUs may receive and store the sensor data as vehicle operation data in the data store 121 for access and/or retrieval by the distance estimating application 120 and the navigation application 122. In some implementations, the processor(s) 115 may be capable of generating and providing electronic display signals to input/output device(s), supporting the display of images, capturing and transmitting images, performing complex tasks including various types of image processing and machine learning implementation, etc. In some implementations, the processor(s) 115 may be coupled to the memory(ies) 117 via the bus 154 to access data and instructions therefrom and store data therein. The bus 154 may couple the processor(s) 115 to the other components of the vehicle platform(s) 103 including, for example, the sensor(s) 113, the memory(ies) 117, the communication unit(s) 119, and/or the data store 121, etc.

The distance estimating application 120 includes software and/or hardware logic executable to perform depth estimations and determine relative distances of objects based on the depth estimations. As illustrated in FIG. 1, the server 101 and the vehicle platform 103a . . . 103n may include instances 120a and 120b . . . 120n of the distance estimating application 120. In some embodiments, each instance 120a and 120b . . . 120n may comprise one or more components the distance estimating application 120 depicted in FIG. 2, and may be configured to fully or partially perform the functionalities described herein depending on where the instance resides. In some embodiments, the distance estimating application 120 may be implemented using software executable by one or more processors of one or more computer devices, using hardware, such as but not limited to a field-programmable gate array (FPGA), an application-specific integrated circuit (ASIC), etc., and/or a combination of hardware and software, etc. The distance estimating application 120 may receive and process the sensor data and/or the vehicle data, and communicate with other elements of the vehicle platform 103 via the bus 154, such as the memory 117, the communication unit 119, the data store 121, the navigation application 122, and various actuators and/or motivators, etc. For example, the distance estimating application 120 may communicate the object positions of various objects depicted in one or more captured images to the navigation application 122. The distance estimating application 120 is described in details below with reference to at least FIGS. 2-6.

The navigation application 122 is computer logic executable to perform path planning and/or provide navigational guidance to users. As illustrated in FIG. 1, the server 101 and the vehicle platform 103a . . . 103n may include instances 122a and 122b . . . 122n of the navigation application 122. In some embodiments, the navigation application 122 may be implemented using software executable by one or more processors of one or more computer devices, using hardware, such as but not limited to a field-programmable gate array (FPGA), an application-specific integrated circuit (ASIC), etc., and/or a combination of hardware and software, etc. The navigation application 122 may receive and process the sensor data and/or the vehicle data, and communicate with other elements of the vehicle platform 103 via the bus 154, such as the memory 117, the communication unit 119, the data store 121, the distance estimating application 120, and various actuators and/or motivators, etc. In some embodiments, the navigation application 122 may perform path planning to determine or update a navigation path based on the object positions of various objects determined by the distance estimating application 120, generate navigation instructions corresponding to the navigation path that is adapted to the object positions of various objects occupying the roads (e.g., suggesting a lane change maneuver), and provide the navigation instructions to the user via one or more output devices of the vehicle platform 103.

The memory(ies) 117 includes a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor(s) 115. For example, the memory(ies) 117 may store the distance estimating application 120 and/or the navigation application 122. In some implementations, the memory(ies) 117 may include one or more of volatile memory and non-volatile memory. For example, the memory(ies) 117 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-Ray™, etc.). It should be understood that the memory(ies) 117 may be a single device or may include multiple types of devices and configurations.

The communication unit 119 transmits data to and receives data from other computing devices to which it is communicatively coupled (e.g., via the network 105) using wireless and/or wired connections. The communication unit 119 may include one or more wired interfaces and/or wireless transceivers for sending and receiving data. The communication unit 119 may couple to the network 105 and communicate with other entities of the system 100, such as other vehicle platform(s) 103 and/or server(s) 101, etc. The communication unit 119 may exchange data with other computing nodes using standard communication methods, such as those discussed above.

The sensor(s) 113 includes any type of sensors suitable for the vehicle platform(s) 103. The sensor(s) 113 may be configured to collect any type of signal data suitable to determine characteristics of the vehicle platform 103 and/or its internal and external environments. Non-limiting examples of the sensor(s) 113 include various optical sensors (CCD, CMOS, 2D, 3D, light detection and ranging (LIDAR), cameras, etc.), audio sensors, motion detection sensors, barometers, altimeters, thermocouples, moisture sensors, infrared (IR) sensors, radar sensors, other photo sensors, gyroscopes, accelerometers, speedometers, steering sensors, braking sensors, switches, vehicle indicator sensors, windshield wiper sensors, geo-location sensors, orientation sensor, wireless transceivers (e.g., cellular, WiFi™, near-field, etc.), sonar sensors, ultrasonic sensors, touch sensors, proximity sensors, distance sensors, etc. In some embodiments, one or more sensors 113 may include externally facing sensors provided at the front side, rear side, right side, and/or left side of the vehicle platform 103 in order to capture the situational context surrounding the vehicle platform 103.

In some embodiments, the sensor(s) 113 may include one or more image sensors (e.g., optical sensors) configured to record images including video images and still images, may record frames of a video stream using any applicable frame rate, and may encode and/or process the video and still images captured using any applicable methods. In some embodiments, the image sensor(s) 113 can capture images of surrounding environments within their sensor range. For example, in the context of a vehicle platform, the image sensors 113 can capture the environment around the vehicle platform 103 including roads, roadside structures, buildings, static roadway objects (e.g., lanes, road markings, traffic signs, traffic cones, barricades, etc.), and/or dynamic roadway objects (e.g., surrounding vehicle platforms 103, road workers, construction vehicles, etc.), etc. In some embodiments, the images captured by the image sensors 113 may be referred to as captured images, as opposed to simulation images generated by environment simulators (e.g., a traffic simulator). In some embodiments, the image sensors 113 may be mounted on the vehicle roof and/or inside the vehicle platform 103 to sense in any direction (forward, rearward, sideward, upward, downward facing, etc.) relative to the moving direction of the vehicle platform 103. In some embodiments, the image sensors 113 may be multidirectional (e.g., LIDAR).

The data store 121 includes a non-transitory storage medium that stores various types of data. For example, the data store 121 may store vehicle data being communicated between different components of a given vehicle platform 103 using a bus, such as a controller area network (CAN) bus. In some embodiments, the vehicle data may include vehicle operation data collected from multiple sensors 113 coupled to different components of the vehicle platform 103 for monitoring operating states of these components, e.g., transmission, speed, acceleration, deceleration, wheel speed (Revolutions Per Minute—RPM), steering angle, braking force, etc. In some embodiments, the vehicle data may include moving direction, vehicle geolocation (e.g., GPS (Global Positioning System) coordinates) indicating geographic location of the vehicle platform 103, etc. In some embodiments, the vehicle data may also include multiple captured images captured by one or more image sensors 113 of the vehicle platform 103 and the image data associated with these images. In some embodiments, the image data may include an image identifier of the image (e.g., image ID), an image data size indicating the data size of the image, an image timestamp indicating date and time when the image is captured, etc.

In some embodiments, the data store 121 may store training data of the distance estimating application 120. In some embodiments, the training data of the distance estimating application 120 may include one or more captured images captured by one or more image sensors (e.g., image sensors 113 included in vehicle platforms 103, image sensors included in roadside units (e.g., surveillance cameras), etc.). In some embodiments, the captured image may depict image content including one or more objects. In particular, the image content of the captured image may depict a real environment including the one or more objects, and may render the one or more objects as they appear in the real environment and reproduced by the image sensor in terms of representation features (e.g., color, texture, etc.).

In some embodiments, the training data of the distance estimating application 120 may include one or more simulation images generated by an environment simulator. In some embodiments, the simulation image may depict simulated image content including one or more simulated objects. In particular, the simulated image content may depict a simulated environment including the one or more simulated objects that the environment simulator generates to simulate a real environment. In some embodiments, the simulation image may depict the simulated environment in a simulation style associated with the environment simulator. In some embodiments, the simulation style may describe the representation features (e.g., color, texture, contrast level, etc.) that the environment simulator may use to render the simulated objects of the simulated environment in the simulation image as the simulation image is generated.

In some embodiments, the data store 121 may store learning data of the distance estimating application 120. As discussed elsewhere herein, the distance estimating application 120 may include one or more machine learning logics, each machine learning logic may have one or more parameters (e.g., coefficients, weight factors, etc.) that are used to perform its corresponding operations. In some embodiments, for each machine learning logic, the learning data may include the values of the one or more parameters associated with the machine learning logic, the synthesized data generated by the machine learning logic during the training stage of the distance estimating application 120, the feedback values that are back-propagated to adjust the one or more parameters of the machine learning logic, etc. Other types of learning data are also possible and contemplated.

In some embodiments, the data store 121 may be part of a data storage system (e.g., a standard data or database management system) for storing and providing access to data. Other types of data stored in the data store 121 are also possible and contemplated.

Other variations and/or combinations are also possible and contemplated. It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2:
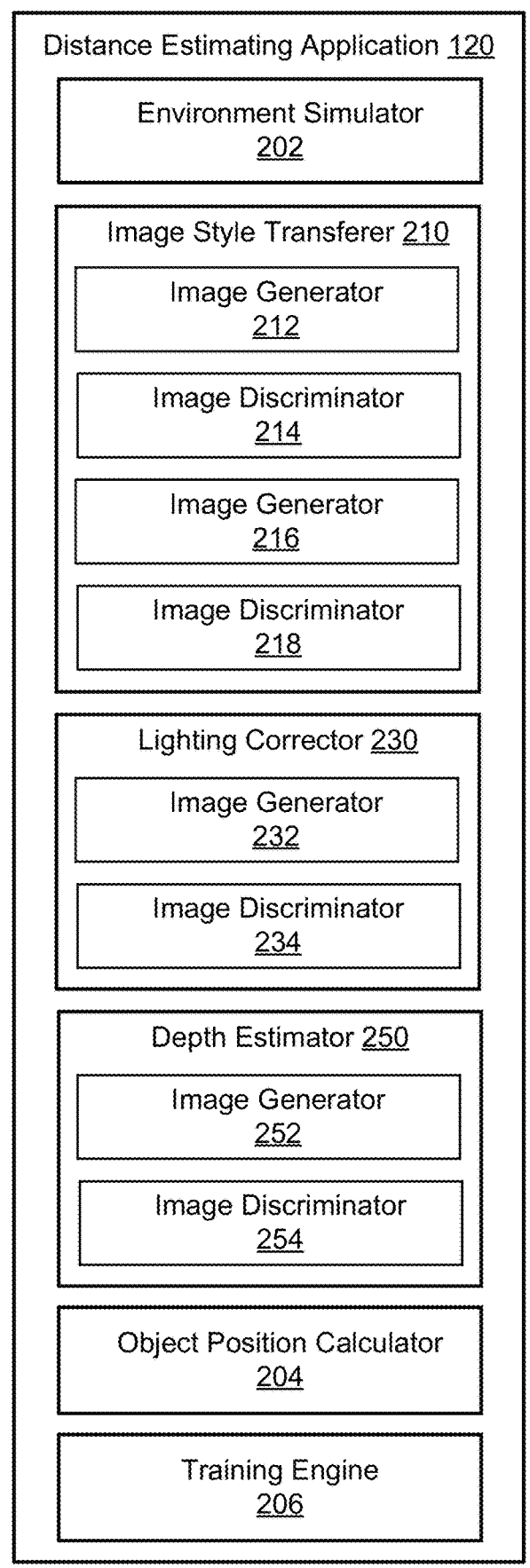
FIG. 2 is a block diagram of an example distance estimating application.

FIG. 2 is a block diagram of an example distance estimating application 120. As depicted, the distance estimating application 120 may include an environment simulator 202, an image style transferer 210, a lighting corrector 230, a depth estimator 250, an object position calculator 204, and a training engine 206. The image style transferer 210 may include an image generator 212, an image discriminator 214, an image generator 216, and an image discriminator 218. The lighting corrector 230 may include an image generator 232 and an image discriminator 234. The depth estimator 250 may include an image generator 252 and an image discriminator 254. It should be understood that the distance estimating application 120 may include additional components such as, but not limited to, a configuration engine, other training engines, an encryption/decryption engine, etc., and/or these various components may be combined into a single engine or divided into additional engines.

The environment simulator 202, the image style transferer 210, the lighting corrector 230, the depth estimator 250, the object position calculator 204, and the training engine 206 may be implemented as software, hardware, or a combination of the foregoing. In some embodiments, the environment simulator 202, the image style transferer 210, the lighting corrector 230, the depth estimator 250, the object position calculator 204, and the training engine 206 may be communicatively coupled by the bus 154 and/or the processor 115 to one another and/or the other components of the computing device 152.

Similarly, the image generator 212, the image discriminator 214, the image generator 216, and the image discriminator 218 included in the image style transferer 210, the image generator 232 and the image discriminator 234 included in the lighting corrector 230, and the image generator 252 and the image discriminator 254 included in the depth estimator 250 may also be implemented as software, hardware, or a combination of the foregoing. The image generator 212, the image discriminator 214, the image generator 216, and the image discriminator 218 included in the image style transferer 210 may be communicatively coupled by the bus 154 and/or the processor 115 to one another, the other components of the distance estimating application 120, and/or the other components of the computing device 152. The image generator 232 and the image discriminator 234 included in the lighting corrector 230 may be communicatively coupled by the bus 154 and/or the processor 115 to one another, the other components of the distance estimating application 120, and/or the other components of the computing device 152. The image generator 252 and the image discriminator 254 included in the depth estimator 250 may be communicatively coupled by the bus 154 and/or the processor 115 to one another, the other components of the distance estimating application 120, and/or the other components of the computing device 152.

In some embodiments, one or more of the components 120, 202, 210, 230, 250, 204, 206, and/or 212, 214, 216, 218, and/or 232, 234, and/or 252, 254 are sets of instructions executable by the processor 115 to provide their functionality. In further embodiments, one or more of the components 120, 202, 210, 230, 250, 204, 206, and/or 212, 214, 216, 218, and/or 232, 234, and/or 252, 254 are storable in the memory 117 and are accessible and executable by the processor 115 to provide their functionality. In any of the foregoing embodiments, these components 120, 202, 210, 230, 250, 204, 206, and/or 212, 214, 216, 218, and/or 232, 234, and/or 252, 254 may be adapted for cooperation and communication with the processor 115 and other components of the computing device 152. The distance estimating application 120, and its components 202, 210, 230, 250, 204, and 206, the components 212, 214, 216, and 218 of the image style transferer 210, the components 232 and 234 of the lighting corrector 230, and the components 252 and 254 of the depth estimator 250 are described in further detail below with reference to at least FIGS. 3A-6.

As discussed elsewhere herein, the distance estimating application 120 may include logic executable to perform a depth estimation and determining a relative distance of an object based on the depth estimation. In some embodiments, the distance estimating application 120 may include multiple machine learning logics implemented on its components. In particular, the distance estimating application 120 may include a first machine learning logic implemented on the image style transferer 210, a second machine learning logic implemented on the lighting corrector 230, and a third machine learning logic implemented on the depth estimator 250. In some embodiments, the image style transferer 210, the lighting corrector 230, and the depth estimator 250 may be individually subjected to a training process before they are implemented to perform their corresponding operations, thereby enabling the distance estimating application 120 to perform the depth estimation and determining the relative distance of the object based on the depth estimation. In some embodiments, the image style transferer 210, the lighting corrector 230, and the depth estimator 250 may be implemented in the form of Generative Adversarial Network (GAN), Recurrent Neural Network (RNN), Long Short-term Memory (LSTM) Network, etc. In some embodiments, the image style transferer 210 may be implemented in the form of cycle-GAN, and the lighting corrector 230 and the depth estimator 250 may be implemented in the form of conditional-GAN. Other system architectures for implementing machine learning logic with various types of supervised and unsupervised learning algorithm are also possible and contemplated.

Figure 3C:
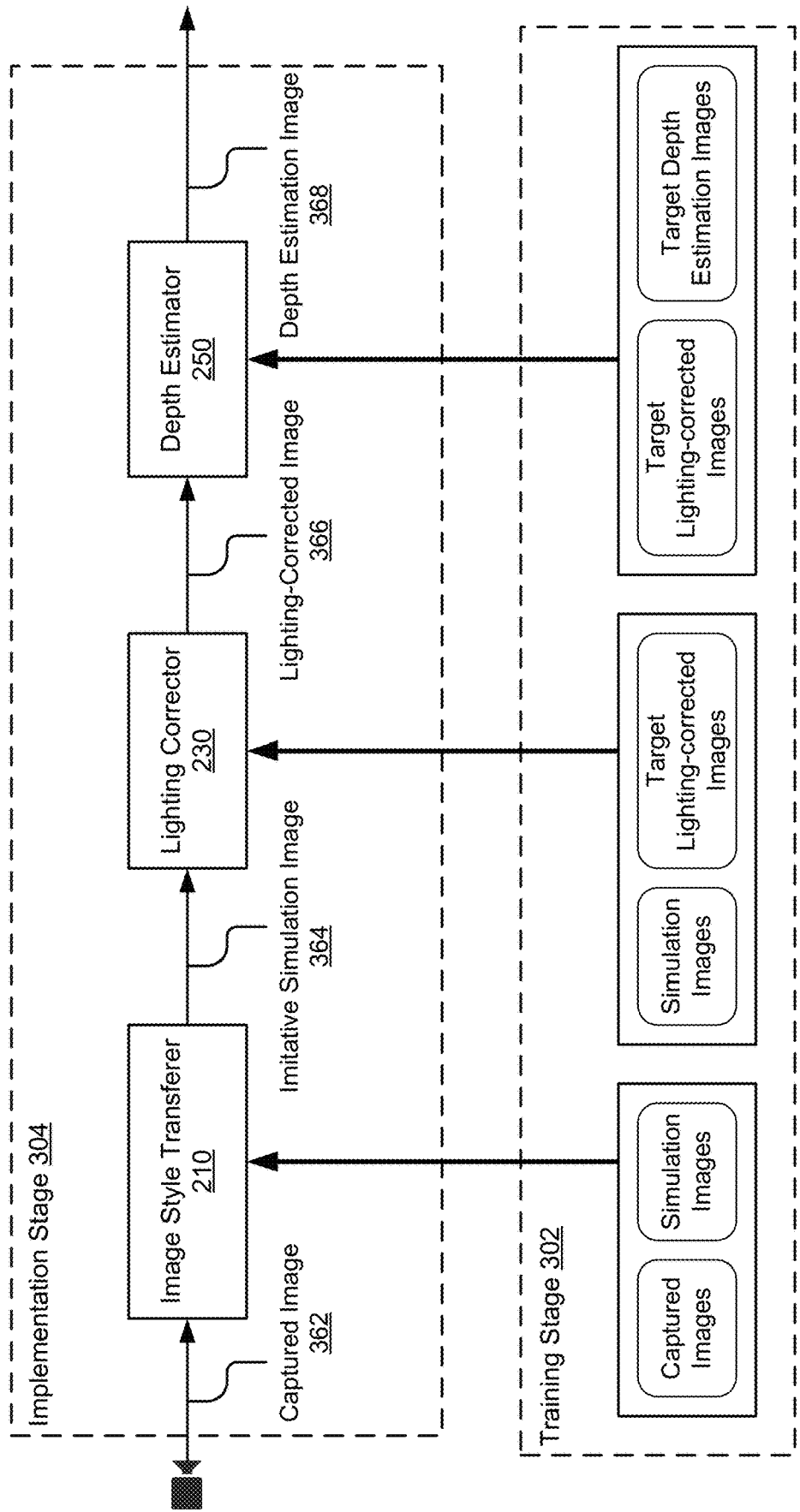

FIGS. 3A-3C illustrate block diagrams 300, 315, and 325 of an example training stage 302 and an example implementation stage 304 of the distance estimating application 120. As depicted in FIG. 3C, in the training stage 302, the image style transferer 210 may be trained to perform an image style transfer to generate an imitative simulation image from a captured image. The training data for training the image style transferer 210 may include one or more captured images captured by one or more image sensors and one or more simulation images generated by the environment simulator 202. As depicted in FIG. 3C, in the training stage 302, the lighting corrector 230 may be trained to adjust one or more lighting effects in the imitative simulation image to generate a lighting-corrected image from the imitative simulation image. The training data for training the lighting corrector 230 may include one or more simulation images and one or more target lighting-corrected images generated by the environment simulator 202. As depicted in FIG. 3C, in the training stage 302, the depth estimator 250 may be trained to perform pixel mappings to generate a depth estimation image from the lighting-corrected image. The training data for training the depth estimator 250 may include one or more target lighting-corrected images and one or more target depth estimation images generated by the environment simulator 202.

Thus, as depicted in FIG. 3C, the training data for training the image style transferer 210, the lighting corrector 230, and the depth estimator 250 may include the captured images captured by one or more image sensors and the simulation images generated by the environment simulator 202.

In some embodiments, the captured image may be captured by an image sensor located at a sensor position (e.g., image sensor 113 of vehicle platform 103, image sensor of roadside unit, etc.). As discussed elsewhere herein, the captured image may depict image content including one or more objects. In particular, the image content of the captured image may depict a real environment including the one or more objects, and may render the one or more objects as they appear in the real environment in terms of representation features (e.g., color, texture, etc.). In some embodiments, the captured image may depict an object with a captured color, a captured texture, and/or other captured representation features. The captured color of the object, the captured texture of the object, and/or other captured representation features of the object in the captured image may be the color of the object, the texture of the object, and/or other representation features of the object as appeared in the real environment and reproduced by the image sensor. In some embodiments, the texture of the object may describe the textural pattern of the object. For example, the texture of a roadway area may describe the textural pattern of the road surface, the textural pattern of the water in the puddle on the road surface, etc.

In some embodiments, the simulation image may be generated by the environment simulator 202. In some embodiments, the environment simulator 202 may generate a simulated environment that simulates a real environment, the simulated environment may include one or more simulated objects. In some embodiments, the environment simulator 202 may also generate one or more simulation images depicting the simulated image content, the simulated image content may depict the simulated environment including the one or more simulated objects. In some embodiments, the simulated image content of the simulation image may depict the simulated environment as if the simulation image is captured by a simulated image sensor from a simulated sensor position. This simulated sensor position may be referred to herein as the simulated sensor position associated with the simulation image. As an example, the environment simulator 202 may generate a simulated road segment that simulates the freeway 1-15 between exit 298 and exit 295. In this example, the environment simulator 202 may generate a simulation image that depicts the simulated road segment as if the simulation image is captured by a simulated image sensor of a simulated vehicle virtually travelling on the simulated road segment.

In some embodiments, the simulation image may depict the simulated environment in a simulation style associated with the environment simulator 202. In some embodiments, the simulation style may describe the representation features (e.g., color, texture, contrast level, etc.) that the environment simulator 202 may use to render the simulated objects of the simulated environment in the simulation images. For each object type being simulated (e.g., vehicles, road surface, sky, etc.), the simulation style may specify simulated color(s) and simulated texture(s) for the object type. In some embodiments, the simulated color of the object type and the simulated texture of the object type may be the color and the texture that the environment simulator 202 may apply to the simulated objects of the object type to depict these simulated objects in the simulation image as the simulation image is generated. It should be understood that the simulation style may also specify other simulated representation features for the object type. Continuing the above example, the simulation image generated by the environment simulator 202 may depict the simulated road segment with multiple simulated vehicles travelling on the simulated road segment. In this example, the simulation image may depict multiple simulated vehicles using the simulated color "blue" and the simulated pattern "solid." The simulation image may depict the road surface of the simulated road segment using the simulated color "gray" and the simulated pattern "dot array" with the dot density of 85%, etc.

Thus, as discussed above, the captured image may depict the real environment including one or more objects with the captured color, captured texture, and/or other captured representation features of the objects as appeared in the real environment and reproduced by the image sensor. On the other hand, the simulation image may depict the simulated environment including one or more simulated objects with the simulated color, simulated texture, and/or other simulated representation features that the environment simulator 202 may use to depict the simulated objects in the simulation image as the environment simulator 202 generates the simulation image. As a result, the captured image and the simulation image may have different look and feel in terms of image style even if their image content are the same or similar.

In some embodiments, for each simulation image, the environment simulator 202 may generate a target lighting-corrected image corresponding to the simulation image. In some embodiments, the simulation image may depict the simulated image content and may include one or more lighting effects (e.g., shadows, glares, reflections, etc.). The target lighting-corrected image may depict the simulated image content of the simulation image, but exclude or reduce the one or more lighting effects. In some embodiments, the target lighting-corrected image may not include any lighting effect, or may have the lighting effects included therein satisfying one or more predefined lighting effect thresholds.

In some embodiments, for each simulation image, the environment simulator 202 may also generate a target depth estimation image corresponding to the simulation image. The target depth estimation image may include grayscale pixels being mapped from image pixels of the simulation image. In some embodiments, the gray intensity of these grayscale pixels in the target depth estimation image may indicate the relative distance(s) between the simulated object(s) depicted in the simulation image and the simulated sensor position associated with the simulation image. In some embodiments, the environment simulator 202 may generate the target depth estimation image from the target lighting-corrected image corresponding to the simulation image, and thus avoiding or limiting the negative impacts of the lighting effects included in the simulation image on the accuracy of the target depth estimation image.

The implementation of generating the training data by the environment simulator 202 is particularly efficient and cost-effective, because the environment simulator 202 may generate a massive amount of simulation images in a limited amount of time. In addition, the simulation images generated by the environment simulator 202 may have high image resolution (e.g., the image resolution of the simulation images may satisfy a predefined image resolution threshold), and thus the image quality of the training data can be improved. Furthermore, as the simulation image is generated by the environment simulator 202, generating the target lighting-corrected image and the target depth estimation image for the simulation image can be performed with lower amount of computational processing and higher accuracy as compared to generating these target images for the captured image captured by the image sensor.

FIG. 3B illustrates the block diagram 315 of a training process for training the image style transferer 210 during the training stage 302. As depicted in FIG. 3C, the image style transferer 210 may be trained to perform an image style transfer to generate an imitative simulation image from a captured image. The training data for training the image style transferer 210 may include one or more captured images captured by one or more image sensors and one or more simulation images generated by the environment simulator 202.

In some embodiments, the captured images in the training data of the image style transferer 210 may form a captured image domain. The captured image domain may include the captured images that depict real environments and render one or more objects as they appear in the real environments and reproduced by the image sensors in terms of representation features (e.g., color, texture, etc.). In some embodiments, the simulation images in the training data of the image style transferer 210 may form a simulation image domain. The simulation image domain may include the simulation images that depict simulated environments in simulation style, the simulation style may include the representation features (e.g., color, texture, etc.) that the environment simulator 202 may use to render simulated objects in the simulation image as the simulation image is generated. In some embodiments, the image content of the captured images in the captured image domain may or may not be relevant to the image content of the simulation images in the simulation image domain. For example, a captured image in the captured image domain may depict White Mountain in New Hampshire while a simulation image in the simulation image domain may depict a simulated road segment of Market St. in San Francisco.

In some embodiments, to train the image style transferer 210 in each training cycle, the training engine 206 may retrieve a captured image 340 from the training data in the data store 121, and input the captured image 340 to the image style transferer 210. As depicted in FIG. 3B, the image generator 212 and the image discriminator 214 of the image style transferer 210 may receive the captured image 340. As discussed elsewhere herein, the captured image 340 may be captured by an image sensor and may depict image content including one or more objects. In particular, the image content of the captured image 340 may depict a real environment including one or more objects with the captured color, captured texture, and/or other captured representation features of the objects as appeared in the real environment and reproduced by the image sensor. As an example, the captured image 340 may be captured by the image sensor 113 of the vehicle platform 103 and may depict a road segment including multiple roadway objects (e.g., lane markings, surrounding vehicles, etc.).

In some embodiments, the image style transferer 210 may generate an imitative simulation image 342 from the captured image 340, the imitative simulation image 342 may depict the image content of the captured image 340 (or at least a portion of the image content of the captured image 340) in the simulation style associated with the environment simulator 202. In particular, the image generator 212 of the image style transferer 210 may analyze the captured image 340, and adjust the captured color(s), the captured texture(s), and/or other captured representation features of the one or more objects as appeared in the real environment and reproduced by the image sensor in the captured image 340 to the simulated color(s), the simulated texture(s), and/or other simulated representation features specified by the simulation style that the environment simulator 202 may use to depict the simulated objects in the simulation images, thereby generating the imitative simulation image 342. Thus, the imitative simulation image 342 may depict the same captured image content as the captured image 340 (e.g., the road segment including multiple roadway objects), but the imitative simulation image 342 may have the look and feel as if it is computationally generated by the environment simulator 202 and not captured by the image sensor. In some embodiments, generating the imitative simulation image 342 from the captured image 340 may be considered as transferring the captured image 340 from the captured image domain to the simulation image domain due to the adjustment in the image style of the captured image 340. In some embodiments, the image generator 212 may send the imitative simulation image 342 to the image generator 216 and the image discriminator 218.

In some embodiments, the image style transferer 210 may generate a synthesized captured image 344 from the imitative simulation image 342, the synthesized captured image 344 generated from the imitative simulation image 342 may reproduce the captured image 340. In particular, as depicted in FIG. 3B, the image generator 216 of the image style transferer 210 may receive the imitative simulation image 342 from the image generator 212. The image generator 216 may analyze the imitative simulation image 342, and adjust the simulated color(s), the simulated texture(s), and/or other simulated representation features of the one or more objects depicted in the imitative simulation image 342 to the captured color(s), the captured texture(s), and/or other captured representation features of the one or more objects as depicted in the captured image 340, thereby generating the synthesized captured image 344. Thus, the synthesized captured image 344 may depict the same captured image content as the captured image 340 (e.g., the road segment including multiple roadway objects), and may reproduce the look and feel of the captured image 340 as if the synthesized captured image 344 is captured by the image sensor rather than being computationally generated by the image generator 216 from the imitative simulation image 342. In some embodiments, generating the synthesized captured image 344 from the imitative simulation image 342 may be considered as transferring the imitative simulation image 342 from the simulation image domain to the captured image domain due to the adjustment in the image style of the imitative simulation image 342.

Thus, as discussed above, the image generator 212 may adjust the image style of the captured image 340 to generate the imitative simulation image 342, thereby transferring the captured image 340 from the captured image domain to the simulation image domain. The image generator 216 may then adjust the image style of the imitative simulation image 342 to generate the synthesized captured image 344, thereby transferring the imitative simulation image 342 from the simulation image domain back to the captured image domain. As a result, the synthesized captured image 344 may depict the image content of the captured image 340, and may reproduce the captured color(s), the captured texture(s), and/or other captured representation features of the one or more objects as depicted in the captured image 340.

In some embodiments, the image style transferer 210 may determine a discrimination output 346 based on the captured image 340 and the synthesized captured image 344. In particular, as depicted in FIG. 3B, the image discriminator 214 of the image style transferer 210 may receive the captured image 340 from the training engine 206 and receive the synthesized captured image 344 from the image generator 216. The image discriminator 214 may compare the synthesized captured image 344 to the captured image 340, and determine the discrimination output 346 based on this comparison. In some embodiments, the discrimination output 346 may indicate a level of similarity between the synthesized captured image 344 and the captured image 340. For example, the discrimination output 346 may indicate that the level of similarity between the synthesized captured image 344 and the captured image 340 is 40%.

In some embodiments, the training engine 206 may adjust one or more parameters associated with the image style transferer 210 based on the discrimination output 346. In particular, as depicted in FIG. 3B, the training engine 206 may back-propagate the discrimination output 346 to the image generator 212, the image generator 216, the image discriminator 214, and the image discriminator 218 of the image style transferer 210, and adjust the one or more parameters being used by these components to perform their corresponding operations based on the discrimination output 346 (e.g., 40%). As discussed above, the discrimination output 346 may indicate the level of similarity between the synthesized captured image 344 and the captured image 340. Therefore, as the one or more parameters of the image generator 212 and the image generator 216 (e.g., coefficients, weight factors, etc.) may be adjusted based on the discrimination output 346, the image generator 212 may learn to adjust the image style of the captured image 340 to generate the imitative simulation image 342, and the image generator 216 may learn to adjust the image style of the imitative simulation image 342 to generate the synthesized captured image 344 such that the level of similarity between the synthesized captured image 344 and the captured image 340 is maximized. On the other hand, as the one or more parameters of the image discriminator 214 may be adjusted based on the discrimination output 346, the image discriminator 214 may learn to differentiate between the synthesized captured image 344 and the captured image 340 despite of the level of similarity between the synthesized captured image 344 and the captured image 340.

In some embodiments, the training engine 206 may determine whether the one or more parameters of the image style transferer 210 are sufficiently adjusted. In some embodiments, the training engine 206 may determine whether the discrimination output 346 satisfies a predefined discrimination output threshold in a predefined number of training cycles (e.g., higher than 90% in at least 250 training cycles). Alternatively, the training engine 206 may determine whether the values of various parameters associated with the image style transferer 210 remain substantially unchanged for a predefined number of training cycles (e.g., the difference between the values of these parameters before and after the parameter adjustment may satisfy a difference value threshold (e.g., less than 0.05) in at least 250 training cycles). In some embodiments, if the discrimination output 346 satisfies the predefined discrimination output threshold in the predefined number of training cycles and/or if the values of various parameters associated with the image style transferer 210 remain substantially unchanged for the predefined number of training cycles, the training engine 206 may determine that the one or more parameters of the image style transferer 210 are sufficiently adjusted. Thus, the training engine 206 may determine that the image style transferer 210 is ready to generate the imitative simulation image from the captured image in the implementation stage 304 (e.g., using its image generator 212 being sufficiently trained). It should be understood that other approaches and/or implementations may be used to determine whether the training process of the image style transferer 210 is completed.

FIG. 3A illustrates the block diagram 300 of a training process for training the lighting corrector 230 during the training stage 302. As depicted in FIG. 3C, the lighting corrector 230 may be trained to adjust one or more lighting effects in the imitative simulation image to generate a lighting-corrected image from the imitative simulation image. The training data for training the lighting corrector 230 may include one or more simulation images and one or more target lighting-corrected images generated by the environment simulator 202.

In some embodiments, to train the lighting corrector 230 in each training cycle, the training engine 206 may retrieve a simulation image 320 and a target lighting-corrected image 322 corresponding to the simulation image 320 from the training data in the data store 121. The training engine 206 may input the simulation image 320 and the target lighting-corrected image 322 to the lighting corrector 230. As depicted in FIG. 3A, the image generator 232 of the lighting corrector 230 may receive the simulation image 320 and the image discriminator 234 of the lighting corrector 230 may receive the target lighting-corrected image 322.

As discussed elsewhere herein, the simulation image 320 may depict simulated image content, the simulated image content may depict a simulated environment including one or more simulated objects that the environment simulator 202 generates to simulate a real environment. As an example, the simulated image content of the simulation image 320 may depict a simulated road segment of Market St. including one or more simulated roadway objects (e.g., lane markings, surrounding vehicles, etc.). In some embodiments, the simulation image 320 may include one or more lighting effects simulating the lighting effects in a captured image (e.g., shadows, glares, reflections, etc.). The lighting effects in the captured image may be caused by an undesirable lighting condition as the captured image is captured by the image sensor and may add an additional layer over the captured image. As a result, the objects depicted in the captured image may be inaccurately processed as foreground objects, elevated surfaces, etc., and thus the accuracy of the depth estimation may be significantly reduced. In some embodiments, the target lighting-corrected image 322 may depict the simulated image content of the simulation image, but exclude or reduce these one or more lighting effects. In some embodiments, the target lighting-corrected image 322 may not include any lighting effect, or may have the lighting effects included therein satisfying one or more predefined lighting effect thresholds (e.g., brightness metric of the shadows is higher than 30%, brightness metric of the glares is lower than 60%, etc.).

In some embodiments, the lighting corrector 230 may generate a synthesized lighting-corrected image 324 from the simulation image 320, the synthesized lighting-corrected image 324 may reduce or remove the one or more lighting effects in the simulation image 320. In particular, the image generator 232 of the lighting corrector 230 may analyze the simulation image 320, and detect one or more shadow regions and/or one or more glare regions in the simulation image 320. In some embodiments, responsive to detecting a shadow region in the simulation image 320, the image generator 232 may adjust the shadow region of the simulation image 320 to reduce or remove one or more shadows in the shadow region. Responsive to detecting a glare region in the simulation image 320, the image generator 232 may adjust the glare region of the simulation image 320 to reduce or remove one or more glares in the glare region. For example, the image generator 232 may adjust various lighting metrics of the shadow region and/or the glare region (e.g., brightness metric, opaque metric, contrast level, etc.) to reduce or remove the shadow(s) and/or the glare(s) in these image regions of the simulation image 320, thereby generating the synthesized lighting-corrected image 324. Thus, the synthesized lighting-corrected image 324 may depict the same simulated image content as the simulation image 320 (e.g., the simulated road segment of Market St. including multiple simulated roadway objects), but may have the one or more lighting effects being reduced or removed by the image generator 232. It should be understood that in addition to shadows and glares, the image generator 232 may also correct and/or adjust other types of lighting effects.

In some embodiments, the lighting corrector 230 may determine a discrimination output 326 based on the target lighting-corrected image 322 and the synthesized lighting-corrected image 324. In particular, as depicted in FIG. 3A, the image discriminator 234 of the lighting corrector 230 may receive the target lighting-corrected image 322 from the training engine 206 and receive the synthesized lighting-corrected image 324 from the image generator 232. The image discriminator 234 may compare the synthesized lighting-corrected image 324 to the target lighting-corrected image 322, and determine the discrimination output 326 based on this comparison. In some embodiments, the discrimination output 326 may indicate a level of similarity between the synthesized lighting-corrected image 324 and the target lighting-corrected image 322. For example, the discrimination output 326 may indicate that the level of similarity between the synthesized lighting-corrected image 324 and the target lighting-corrected image 322 is 70%.

In some embodiments, the training engine 206 may adjust one or more parameters associated with the lighting corrector 230 based on the discrimination output 326. In particular, as depicted in FIG. 3A, the training engine 206 may backpropagate the discrimination output 326 to the image generator 232 and the image discriminator 234 of the lighting corrector 230, and adjust the one or more parameters being used by these components to perform their corresponding operations based on the discrimination output 326 (e.g., 70%). As discussed above, the discrimination output 326 may indicate the level of similarity between the synthesized lighting-corrected image 324 and the target lighting-corrected image 322. Therefore, as the one or more parameters of the image generator 232 (e.g., coefficients, weight factors, etc.) may be adjusted based on the discrimination output 326, the image generator 232 may learn to detect and adjust the image regions including the lighting effects in the simulation image 320 to generate the synthesized lighting-corrected image 324 such that the level of similarity between the synthesized lighting-corrected image 324 and the target lighting-corrected image 322 is maximized. On the other hand, as the one or more parameters of the image discriminator 234 may be adjusted based on the discrimination output 326, the image discriminator 234 may learn to differentiate between synthesized lighting-corrected image 324 and the target lighting-corrected image 322 despite of the level of similarity between the synthesized lighting-corrected image 324 and the target lighting-corrected image 322.

In some embodiments, the training engine 206 may determine whether the one or more parameters of the lighting corrector 230 are sufficiently adjusted. In some embodiments, the training engine 206 may determine whether the discrimination output 326 satisfies a predefined discrimination output threshold in a predefined number of training cycles (e.g., higher than 95% in at least 200 training cycles). Alternatively, the training engine 206 may determine whether the values of various parameters associated with the lighting corrector 230 remain substantially unchanged for a predefined number of training cycles (e.g., the difference between the values of these parameters before and after the parameter adjustment may satisfy a difference value threshold (e.g., less than 0.04) in 200 training cycles). In some embodiments, if the discrimination output 326 satisfies the predefined discrimination output threshold in the predefined number of training cycles and/or if the values of various parameters associated with the lighting corrector 230 remain substantially unchanged for the predefined number of training cycles, the training engine 206 may determine that the one or more parameters of the lighting corrector 230 are sufficiently adjusted. Thus, the training engine 206 may determine that the lighting corrector 230 is ready to generate the lighting-corrected image from the imitative simulation image in the implementation stage 304 (e.g., using its image generator 232 being sufficiently trained). It should be understood that other approaches and/or implementations may be used to determine whether the training process of the lighting corrector 230 is completed.

As depicted in FIG. 3A, the block diagram 300 also illustrates a training process for training the depth estimator 250 during the training stage 302. As depicted in FIG. 3C, the depth estimator 250 may be trained to perform the pixel mappings to generate a depth estimation image from the lighting-corrected image. The training data for training the depth estimator 250 may include one or more target lighting-corrected images and one or more target depth estimation images generated by the environment simulator 202.

In some embodiments, to train the depth estimator 250 in each training cycle, the training engine 206 may retrieve a simulation image 330 and a target depth estimation image 332 corresponding to the simulation image 330 from the training data in the data store 121. The training engine 206 may input the simulation image 330 and the target depth estimation image 332 to the depth estimator 250. As depicted in FIG. 3A, the image generator 252 of the depth estimator 250 may receive the simulation image 330 and the image discriminator 254 of the depth estimator 250 may receive the target depth estimation image 332.

In some embodiments, the simulation image 330 may depict a simulated environment including one or more simulated objects generated by the environment simulator 202, and the simulation image 330 may exclude or reduce one or more lighting effects. As the simulation image 330 may exclude or reduce the one or more lighting effects (e.g., shadows, glares, reflections, etc.), the negative impacts of these lighting effects on the pixel mappings performed by the image generator 252 can be avoided or limited. In some embodiments, the target depth estimation image 332 corresponding to the simulation image 330 may be generated from the simulation image 330 and may include grayscale pixels being mapped from image pixels of the simulation image 330. As discussed elsewhere herein, the gray intensity of these grayscale pixels in the target depth estimation image 332 may indicate the relative distance(s) between the simulated object(s) depicted in the simulation image 330 and the simulated sensor position associated with the simulation image 330.

In some embodiments, the simulation image 330 may be a target lighting-corrected image corresponding to a simulation image generated by the environment simulator 202. As discussed elsewhere herein, the target lighting-corrected image may depict the simulated image content of the simulation image but may not include any lighting effect, or may have the lighting effects included therein satisfying one or more predefined lighting effect thresholds (e.g., brightness metric of the shadows is higher than 30%, brightness metric of the glares is lower than 60%, etc.). In some embodiments, the target depth estimation image 332 may be the target depth estimation image corresponding to the same simulation image and may be generated from the target lighting-corrected image of the simulation image.

In some embodiments, the depth estimator 250 may generate a synthesized depth estimation image 334 from the simulation image 330 (e.g., the target lighting-corrected image). In particular, the image generator 252 of the depth estimator 250 may analyze the simulation image 330 (e.g., the target lighting-corrected image), and map the image pixels in the simulation image 330 to the grayscale pixels in the synthesized depth estimation image 334. The grayscale pixel in the synthesized depth estimation image 334 may be represented with a shade of gray indicating the brightness of the corresponding image pixel in the simulation image 330. In some embodiments, the relative distance between the corresponding image pixel in the simulation image 330 and the simulated sensor position associated with the simulation image 330 may be inversely proportional to the gray intensity of the grayscale pixel in the synthesized depth estimation image 334.

As an example, the synthesized depth estimation image 334 may include a first grayscale pixel corresponding to a first image pixel in the simulation image 330, and a second grayscale pixel corresponding to a second image pixel in the simulation image 330. The first grayscale pixel may have the pixel color "white" with the gray intensity of 255, and the second grayscale pixel may have the pixel color "black" with the gray intensity of 0. In this example, the relative distance between the first image pixel corresponding to the first grayscale pixel with the pixel color "white" and the simulated sensor position associated with the simulation image 330 may be inversely proportional to the gray intensity of 255. The relative distance between the second image pixel corresponding to the second grayscale pixel with the pixel color "black" and the simulated sensor position associated with the simulation image 330 may be inversely proportional to the gray intensity of 0. As a result, the first image pixel corresponding to the first grayscale pixel having the pixel color "white" may have a lower relative distance to the simulated sensor position associated with the simulation image 330 as compared to the second image pixel corresponding to the second grayscale pixel with the pixel color "black."

Thus, as discussed above, the gray intensity of the grayscale pixels in the synthesized depth estimation image 334 may indicate the relative distances between the corresponding image pixels in the simulation image 330 and the simulated sensor position associated with the simulation image 330. As a result, these grayscale pixels in the synthesized depth estimation image 334 may indicate the relative distances between one or more objects depicted in the simulation image 330 and the simulated sensor position associated with the simulation image 330 as being determined by the image generator 252.

In some embodiments, the depth estimator 250 may determine a discrimination output 336 based on the target depth estimation image 332 and the synthesized depth estimation image 334. In particular, as depicted in FIG. 3A, the image discriminator 254 of the depth estimator 250 may receive the target depth estimation image 332 from the training engine 206 and receive the synthesized depth estimation image 334 from the image generator 252. The image discriminator 254 may compare the synthesized depth estimation image 334 to the target depth estimation image 332, and determine the discrimination output 336 based on this comparison. In some embodiments, the discrimination output 336 may indicate a level of similarity between the synthesized depth estimation image 334 and the target depth estimation image 332. For example, the discrimination output 336 may indicate that the level of similarity between the synthesized depth estimation image 334 and the target depth estimation image 332 is 80%.

In some embodiments, the training engine 206 may adjust one or more parameters associated with the depth estimator 250 based on the discrimination output 336. In particular, as depicted in FIG. 3A, the training engine 206 may back-propagate the discrimination output 336 to the image generator 252 and the image discriminator 254 of the depth estimator 250, and adjust the one or more parameters being used by these components to perform their corresponding operations based on the discrimination output 336 (e.g., 80%). As discussed above, the discrimination output 336 may indicate the level of similarity between the synthesized depth estimation image 334 and the target depth estimation image 332. Therefore, as the one or more parameters of the image generator 252 (e.g., coefficients, weight factors, etc.) may be adjusted based on the discrimination output 336, the image generator 252 may learn to map the image pixels in the simulation image 330 to the grayscale pixels to generate the synthesized depth estimation image 334 such that the level of similarity between the synthesized depth estimation image 334 and the target depth estimation image 332 is maximized. On the other hand, as the one or more parameters of the image discriminator 254 may be adjusted based on the discrimination output 336, the image discriminator 254 may learn to differentiate between the synthesized depth estimation image 334 and the target depth estimation image 332 despite of the level of similarity between the synthesized depth estimation image 334 and the target depth estimation image 332.

In some embodiments, the training engine 206 may determine whether the one or more parameters of the depth estimator 250 are sufficiently adjusted. In some embodiments, the training engine 206 may determine whether the discrimination output 336 satisfies a predefined discrimination output threshold in a predefined number of training cycles (e.g., higher than 85% in at least 200 training cycles). Alternatively, the training engine 206 may determine whether the values of various parameters associated with the depth estimator 250 remain substantially unchanged for a predefined number of training cycles (e.g., the difference between the values of these parameters before and after the parameter adjustment may satisfy a difference value threshold (e.g., less than 0.03) in 200 training cycles). In some embodiments, if the discrimination output 336 satisfies the predefined discrimination output threshold in the predefined number of training cycles and/or if the values of various parameters associated with the depth estimator 250 remain substantially unchanged for the predefined number of training cycles, the training engine 206 may determine that the one or more parameters of the depth estimator 250 are sufficiently adjusted. Thus, the training engine 206 may determine that the depth estimator 250 is ready to generate the depth estimation image from the lighting-corrected image in the implementation stage 304 (e.g., using its image generator 252 being sufficiently trained). It should be understood that other approaches and/or implementations may be used to determine whether the training process of the depth estimator 250 is completed.

Figure 4:
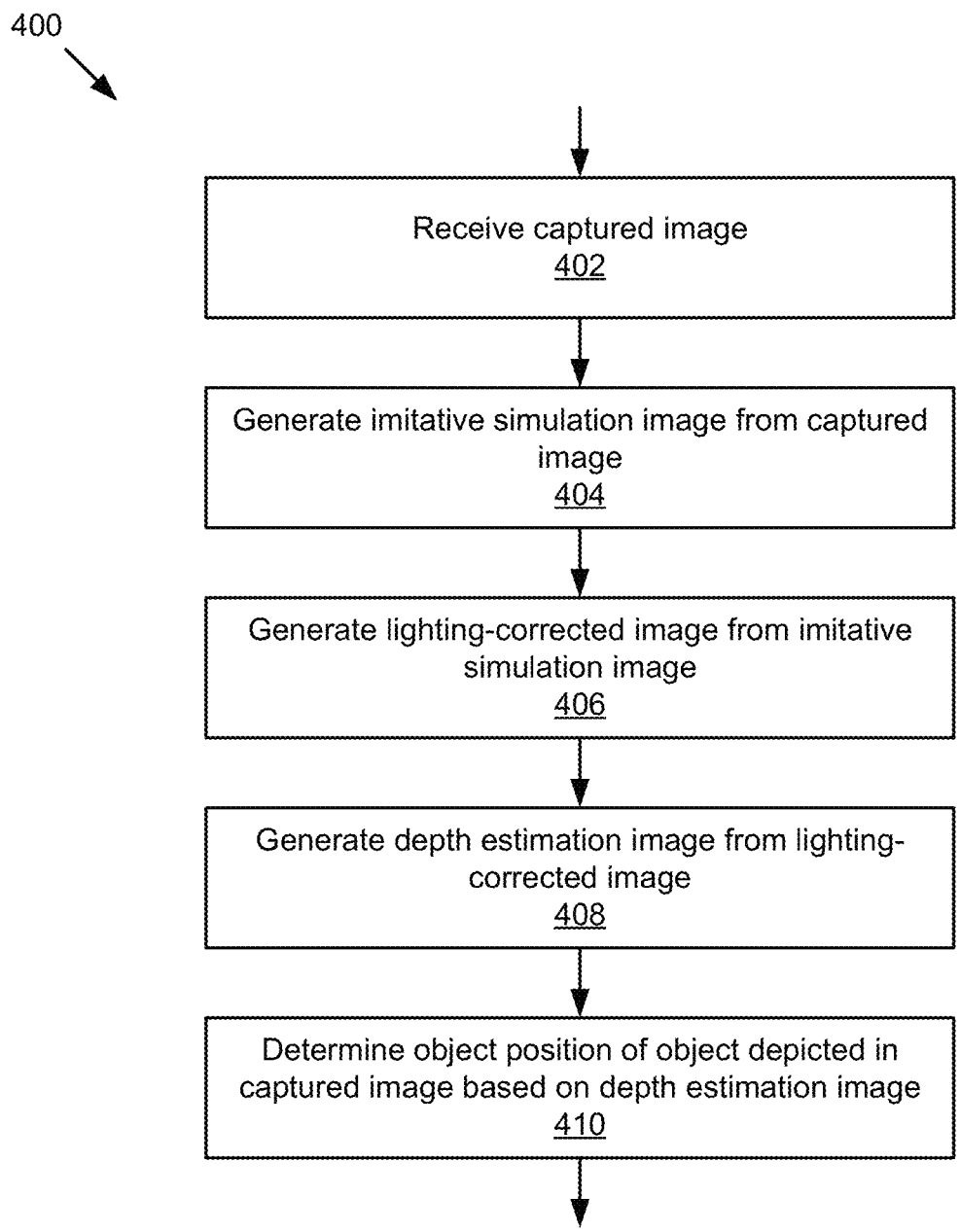
FIG. 4 is a flowchart of an example method for performing the depth estimation and determining the relative distance of the object based on the depth estimation.

FIG. 4 is a flowchart of an example method 400 for performing a depth estimation and determining the relative distance of the object based on the depth estimation. In some embodiments, the method 400 may be performed by the distance estimating application 120 in the implementation stage 304 depicted in FIG. 3C. In the implementation stage 304, the image style transferer 210, the lighting corrector 230, and the depth estimator 250 may be sufficiently trained to perform their corresponding operations. In block 402, the distance estimating application 120 may receive a captured image 362 captured by an image sensor located at a sensor position as an input image. The captured image 362 may depict image content, the image content may depict a real environment including one or more objects. For example, the image content of the captured image 362 may depict a road segment including one or more roadway objects associated with the road segment (e.g., lane markings, surrounding vehicles, etc.).

Figure 5:
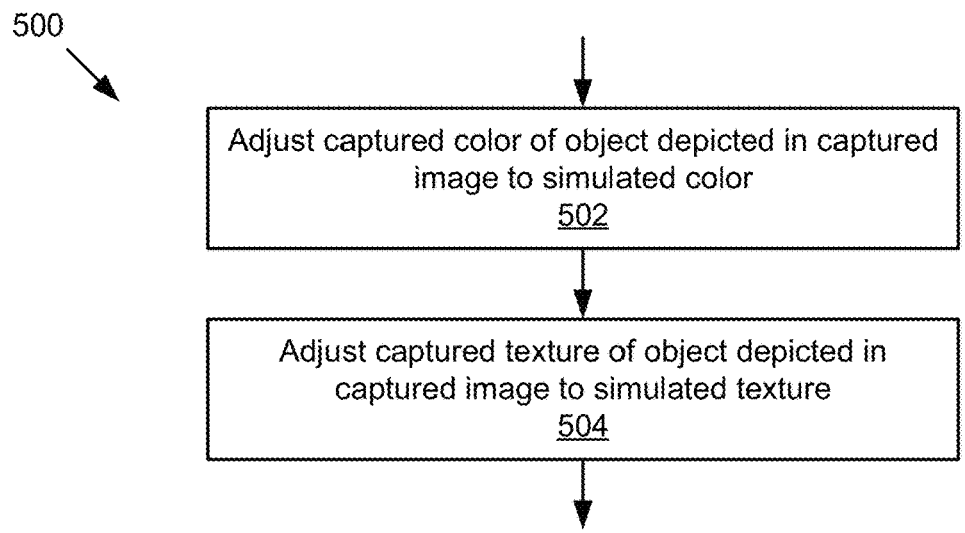
FIG. 5 is a flowchart of an example method for generating an imitative simulation image.

In block 404, the distance estimating application 120 may generate an imitative simulation image 364 from the captured image 362 using the trained image style transferer 210. FIG. 5 is a flowchart of an example method 500 for generating the imitative simulation image from the captured image. As discussed elsewhere herein, the captured image 362 may depict the real environment including the one or more objects with the captured color, the captured texture, and/or other captured representation features of the objects as appeared in the real environment and reproduced by the image sensor.

In block 502, the image generator 212 of the trained image style transferer 210 may adjust the captured color(s) of the one or more objects as appeared in the real environment and reproduced by the image sensor in the captured image 362 to the simulated color(s) specified by the simulation style that the environment simulator 202 may use to depict the simulated objects in the simulation images. In block 504, the image generator 212 may adjust the captured texture(s) of the one or more objects as appeared in the real environment and reproduced by the image sensor in the captured image 362 to the simulated texture(s) specified by the simulation style that the environment simulator 202 may use to depict the simulated objects in the simulation images. It should be understood that the image generator 212 may also adjust other captured representation features of the one or more objects as depicted in the captured image 362 to the corresponding simulated representation features specified by the simulation style associated with the environment simulator 202.

Thus, by adjusting the captured color(s), the captured texture(s), and/or other captured representation features of the one or more objects as depicted in the captured image 362 to the simulated color(s), the simulated texture(s), and/or other simulated representation features, the image generator 212 may generate the imitative simulation image 364 depicting the image content (or at least a portion of the image content) of the captured image 362 in the simulation style associated with the environment simulator 202. The imitative simulation image 364 may depict the same image content as the captured image 362 (e.g., the road segment including multiple roadway objects), but the imitative simulation image 364 may have the look and feel as if it is computationally generated by the environment simulator 202 and not captured by the image sensor.

This implementation is particularly advantageous, because it can improve the performance of the lighting corrector 230 and the depth estimator 250 in the implementation stage 304. As discussed elsewhere herein, the lighting corrector 230 and the depth estimator 250 may be trained to perform their operations using the simulation images and the target images generated by the environment simulator 202 in the training stage 302, while the captured image 362 to be processed in the implementation stage 304 may be captured by the image sensor. Therefore, adjusting the captured image 362 to the simulation style associated with the environment simulator 202 may avoid or limit the negative impacts on the performance of the lighting corrector 230 and the depth estimator 250 caused by the image style difference between the simulation images used for training these components and the captured image 362 to be processed in the implementation stage 304.

Figure 6:
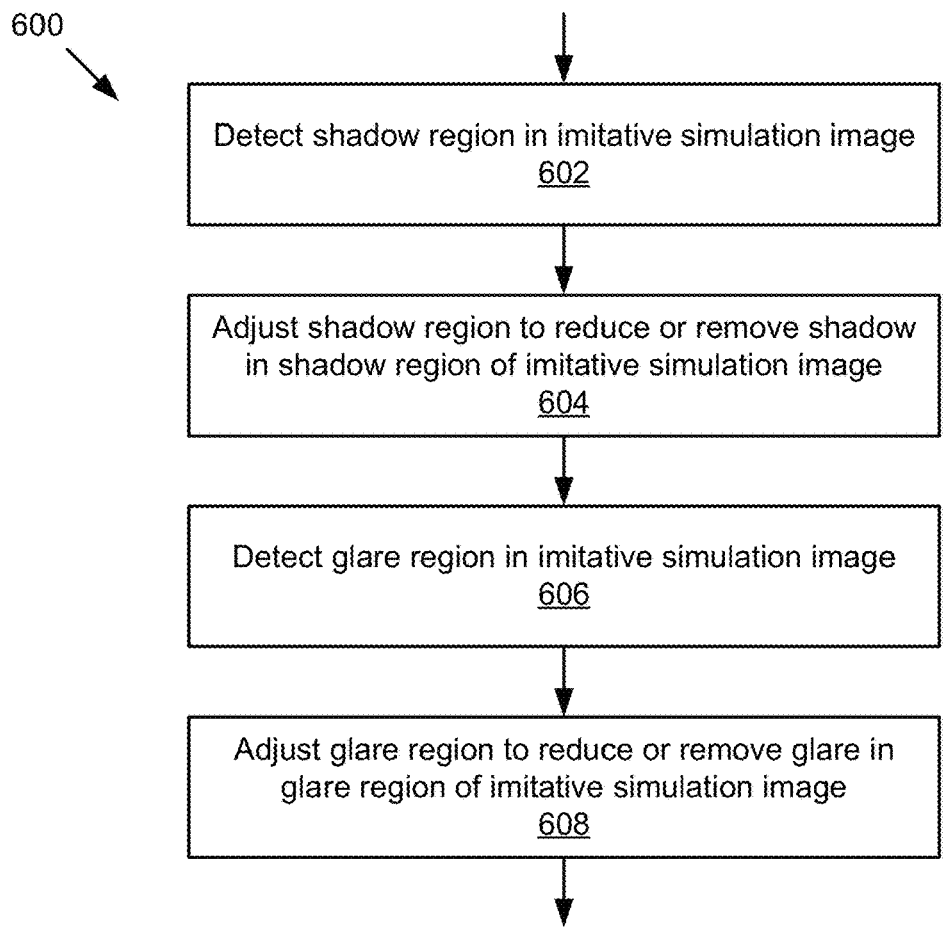
FIG. 6 is a flowchart of an example method for generating a lighting-corrected image.

Referring back to FIG. 4, in block 406, the distance estimating application 120 may generate a lighting-corrected image 366 from the imitative simulation image 364 using the trained lighting corrector 230. FIG. 6 is a flowchart of an example method 600 for generating the lighting-corrected image from the imitative simulation image. As discussed elsewhere herein, the imitative simulation image 364 may depict the image content of the captured image 362 in the simulated color(s), the simulated texture(s), and/or other simulated representation features specified by the simulation style associated with the environment simulator 202.

In block 602, the image generator 232 of the trained lighting corrector 230 may detect one or more shadow regions in the imitative simulation image 364. Responsive to detecting a shadow region in the imitative simulation image 364, in block 604, the image generator 232 may adjust the shadow region to reduce or remove one or more shadows in the shadow region. For example, the image generator 232 may adjust various lighting metrics of the shadow region (e.g., brightness metric, opaque metric, contrast level, etc.) to reduce or remove the one or more shadows in the shadow region of the imitative simulation image 364. In block 606, the image generator 232 may detect one or more glare regions in the imitative simulation image 364. Responsive to detecting a glare region in the imitative simulation image 364, in block 608, the image generator 232 may adjust the glare region to reduce or remove one or more glares in the glare region. For example, the image generator 232 may adjust various lighting metrics of the glare region (e.g., brightness metric, opaque metric, contrast level, etc.) to reduce or remove the one or more glares in the glare region of the imitative simulation image 364. It should be understood that in addition to shadows and glares, the image generator 232 may also correct and/or adjust other types of lighting effects in the imitative simulation image 364.

Thus, by reducing or removing the shadow(s), the glare(s), and/or other types of lighting effects in the imitative simulation image 364, the image generator 232 may generate the lighting-corrected image 366. The lighting-corrected image 366 may depict the image content of the captured image 362 in the simulation style associated with the environment simulator 202, and the lighting-corrected image 366 may exclude or reduce the one or more lighting effects (e.g., shadows, glares, reflections, etc.). In particular, the lighting-corrected image 366 may not include any lighting effect, or may have the lighting effects included therein satisfying one or more predefined lighting effect thresholds (e.g., brightness metric of the shadows is higher than 30%, brightness metric of the glares is lower than 60%, etc.). This implementation is particularly advantageous, because it can improve the accuracy of the depth estimation performed by the depth estimator 250. As discussed elsewhere herein, the captured image 362 may include one or more lighting effects caused by undesirable lighting conditions as the captured image 362 is captured. These lighting effects may add an additional layer over the captured image 362 and cause the depth estimator 250 to inaccurately process the objects depicted in the captured image 362 as foreground objects, elevated surfaces, etc. Therefore, as the lighting-corrected image 366 may exclude or reduce these lighting effects, the negative impacts of the lighting effects on the depth estimation can be avoided or limited, thereby significantly improving the accuracy of the depth estimation performed by the depth estimator 250.

Referring back to FIG. 4, in block 408, the distance estimating application 120 may generate a depth estimation image 368 from the lighting-corrected image 366 using the trained depth estimator 250. As discussed elsewhere herein, the lighting-corrected image 366 may depict the image content of the captured image 362 in the simulation style associated with the environment simulator 202, and the lighting-corrected image 366 may exclude or reduce the one or more lighting effects (e.g., shadows, glares, reflections, etc.).

In some embodiments, the image generator 252 of the trained depth estimator 250 may map the image pixels in the lighting-corrected image 366 to grayscale pixels to generate the depth estimation image 368. The grayscale pixel in the depth estimation image 368 may be represented with a shade of gray indicating the brightness of the corresponding image pixel in the lighting-corrected image 366. As the lighting-corrected image 366 may depict the image content of the captured image 362 but excluding or reducing the lighting effects, the gray intensity of the grayscale pixel in the depth estimation image 368 may indicate the relative distance between the corresponding image pixel in the captured image 362 and the sensor position associated with the captured image 362. In some embodiments, the sensor position associated with the captured image 362 may be the sensor position of the image sensor as the captured image 362 is captured. In some embodiments, the relative distance between the corresponding image pixel in the captured image 362 and the sensor position associated with the captured image 362 may be inversely proportional to the gray intensity of the grayscale pixel in the depth estimation image 368. As the depth estimation image 368 may indicate the relative distances between multiple image pixels depicting an object in the captured image 362 and the sensor position associated with the captured image 362, the depth estimation image 368 may therefore indicate the relative distance between the object depicted in the captured image 362 and the sensor position associated with the captured image 362.

Thus, as discussed above, the captured image 362 may be sequentially subjected to multiple processing operations performed by the image style transferer 210, the lighting corrector 230, and the depth estimator 250 of the distance estimating application 120. As depicted in FIG. 3C, the image style transferer 210 may generate the imitative simulation image 364 from the captured image 362. The imitative simulation image 364 may depict the image content of the captured image 362 in the simulation style associated with the environment simulator 202. As depicted in FIG. 3C, the lighting corrector 230 may then generate the lighting-corrected image 366 from the imitative simulation image 364. The lighting-corrected image 366 may depict the image content of the captured image 362 in the simulation style associated with the environment simulator 202, and the lighting-corrected image 366 may exclude or reduce the one or more lighting effects (e.g., shadows, glares, reflections, etc.). As depicted in FIG. 3C, the depth estimator 250 may then generate the depth estimation image 368 from the lighting-corrected image 366. As the depth estimation image 368 may be generated from the lighting-corrected image 366 rather than being generated directly from the captured image 362, the negative impacts on the depth estimation caused by the image style difference between the simulation images used for training the depth estimator 250 and the captured image 362 to be processed, and the negative impacts on the depth estimation caused by the lighting effects included in the captured image 362 may be avoided or limited, thereby significantly improving the accuracy of the depth estimation image 368. As discussed elsewhere herein, the depth estimation image 368 may indicate the relative distances of one or more objects depicted in the captured image 362 and the sensor position associated with the captured image 362.

In block 410, the object position calculator 204 may determine the object positions of the one or more objects depicted in the captured image 362 based on the depth estimation image 368. In some embodiments, to determine the object position of an object depicted in the captured image 362, the object position calculator 204 may match the captured image 362 including the object with a captured image 370 and a captured image 372 also including the object (not shown). The captured image 362, the captured image 370, and the captured image 372 including the object may be captured at the same timestamp. In some embodiments, the image style transferer 210, the lighting corrector 230, and the depth estimator 250 may perform their operations to generate a depth estimation image 380 corresponding to the captured image 370 (not shown), and a depth estimation image 382 corresponding to the captured image 372 (not shown) in a manner similar to generating the depth estimation image 368 corresponding to the captured image 362 as discussed above.

In some embodiments, the object position calculator 204 may determine the object position of the object based on the depth estimation image 368 corresponding to the captured image 362, the depth estimation image 380 corresponding to the captured image 370, and a depth estimation image 382 corresponding to the captured image 372. As discussed elsewhere herein, the depth estimation image 368 corresponding to the captured image 362 may indicate a first relative distance of the object (e.g., a traffic cone) depicted in the captured image 362 and the sensor position associated with the captured image 362. The sensor position associated with the captured image 362 may be the sensor position of the image sensor capturing the captured image 362 at the timestamp that the captured image 362 is captured. Similarly, the depth estimation image 380 corresponding to the captured image 370 may indicate a second relative distance of the same object (e.g., the traffic cone) depicted in the captured image 370 and the sensor position associated with the captured image 370. The sensor position associated with the captured image 370 may be the sensor position of the image sensor capturing the captured image 370 at the timestamp that the captured image 370 is captured. Similarly, the depth estimation image 382 corresponding to the captured image 372 may indicate a third relative distance of the same object (e.g., the traffic cone) depicted in the captured image 372 and the sensor position associated with the captured image 372. The sensor position associated with the captured image 372 may be the sensor position of the image sensor capturing the captured image 372 at the timestamp that the captured image 372 is captured.

As discussed above, the captured image 362, the captured image 370, and the captured image 372 depicting the object may be captured at the same timestamp. Therefore, in some embodiments, the object position calculator 204 may determine the object position of the object depicted in these captured images (e.g., the traffic cone) to be the geographic location that has the first relative distance to the sensor position associated with the captured image 362, the second relative distance to the sensor position associated with the captured image 370, and the third relative distance to the sensor position associated with the captured image 372. Other implementation for determining the object position of the object based on the depth estimation image(s) of the captured image(s) including the object are also possible and contemplated.

In some embodiments, the distance estimating application 120 may transmit the object position of various objects determined based on the depth estimation images to the navigation application 122. The navigation application 122 may use the object position of various objects computed by the distance estimating application 120 to perform path planning. As an example, the navigation application 122 may analyze the object positions of various vehicles travelling on the current road segment, and provide a navigation guidance suggesting the user of the vehicle platform 103 to make a lane change maneuver and shift to a less crowded lane for faster commute. In another example, the navigation application 122 may position various roadway objects on a geographical map based on their object positions to generate a dynamic traffic situation map, the dynamic traffic situation map may describe multiple traffic situations occurred on various road segments (e.g., traffic accident, construction zone, etc.). In some embodiments, for each traffic situation, the dynamic traffic situation map may indicate the roadway objects present in the traffic situation (e.g., traffic cones, barricades, road workers, emergency vehicles, etc.), the coverage area encompassing the roadway objects of the traffic situation, etc. In some embodiments, the navigation application 122 may calculate the optimal vehicle route for the vehicle platform 103 to get to its destination based on the dynamic traffic situation map. For example, the navigation application 122 may adapt the vehicle route of the vehicle platform 103 to avoid the road segments that have the traffic situation occupying the road and slowing down the traffic flow.

In some embodiments, the navigation application 124 may generate and display navigation guidance, notifications, alerts, description information of traffic situations, etc. to the user of the vehicle platform 103 via one or more output device of the vehicle platform 103. For example, the navigation application 124 may provide a voice instruction suggesting the user of the vehicle platform 103 to make the lane change maneuver. In another example, the navigation application 124 may display the dynamic traffic situation map on a touch screen with multiple route options to get around the traffic situation indicated on the dynamic traffic situation map. As the user of the vehicle platform 103 provides a user input to select a route option from the multiple route options (e.g., issue a voice command, interact with the touch screen, etc.), the navigation application 124 may provide the navigation guidance corresponding to the selected route option for the user to follow and avoid the road segment on which the traffic situation occupies.

In the above description, e.g., with reference to the methods, system, and other aspects, to ease description, some elements are referred to using the labels first, second, third, etc. These labels are intended to help to distinguish the elements but do not necessarily imply any particular order or ranking unless indicated otherwise.

For purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method comprising:
   receiving a captured image depicting image content including an object, the captured image being captured by an image sensor located at a sensor position;
   generating, using a trained first machine learning logic, a lighting-corrected image from an imitative simulation image depicting at least a portion of the image content of the captured image in a simulation style associated with an environment simulator;
   generating, using a trained second machine learning logic, a depth estimation image from the lighting-corrected image, the depth estimation image indicating a relative distance between the object depicted in the captured image and the sensor position of the image sensor; and
   determining an object position of the object depicted in the captured image based on the depth estimation image.

2. The method of claim 1, wherein the image content of the captured image depicts a road segment and the object depicted in the captured image is a roadway object associated with the road segment.

3. The method of claim 1, wherein generating the lighting-corrected image from the imitative simulation image includes:
   detecting, using the trained first machine learning logic, one or more of a shadow region and a glare region in the imitative simulation image;
   responsive to detecting the shadow region in the imitative simulation image, adjusting, using the trained first machine learning logic, the shadow region to reduce or remove a shadow in the shadow region of the imitative simulation image; and
   responsive to detecting the glare region in the imitative simulation image, adjusting, using the trained first machine learning logic, the glare region to reduce or remove a glare in the glare region of the imitative simulation image.

4. The method of claim 1, further comprising:
   generating, using a trained third machine learning logic, the imitative simulation image from the captured image.

5. The method of claim 4, wherein
- the image content of the captured image depicts a real environment including the object;
- the simulation style associated with the environment simulator includes a simulated color and a simulated texture generated by the environment simulator; and
- generating the imitative simulation image from the captured image includes adjusting, using the trained third machine learning logic, one or more of a captured color of the object and a captured texture of the object to one or more of the simulated color and the simulated texture.

6. The method of claim 1, wherein generating the depth estimation image from the lighting-corrected image includes:
- mapping, using the trained second machine learning logic, one or more image pixels in the lighting-corrected image to one or more grayscale pixels in the depth estimation image.

7. The method of claim 1, wherein
- the trained first machine learning logic is a conditional-Generative Adversarial Network (GAN) and the trained second machine learning logic is another conditional-GAN; and the method includes
- generating, using a trained third machine learning logic, the imitative simulation image from the captured image, the trained third machine learning logic being a cycle-GAN.

8. A system comprising:
- one or more processors;
- an environment simulator executable by the one or more processors to generate one or more simulation images;
- a first machine learning logic executable by the one or more processors to receive a captured image depicting image content including an object, the captured image being captured by an image sensor located at a sensor position, and generate an imitative simulation image from the captured image, the imitative simulation image depicting at least a portion of the image content of the captured image in a simulation style associated with the environment simulator;
- a second machine learning logic executable by the one or more processors to receive the imitative simulation image from the first machine learning logic, and generate a lighting-corrected image from the imitative simulation image;
- a third machine learning logic executable by the one or more processors to receive the lighting-corrected image from the second machine learning logic, and generate a depth estimation image from the lighting-corrected image, the depth estimation image indicating a relative distance between the object depicted in the captured image and the sensor position of the image sensor; and
- an object position calculator executable by the one or more processors to determine an object position of the object depicted in the captured image based on the depth estimation image.

9. The system of claim 8, wherein the image content of the captured image depicts a road segment and the object depicted in the captured image is a roadway object associated with the road segment.

10. The system of claim 8, wherein to generate the lighting-corrected image from the imitative simulation image, the second machine learning logic performs one or more operations including:
- detecting one or more of a shadow region and a glare region in the imitative simulation image;
- responsive to detecting the shadow region in the imitative simulation image, adjusting the shadow region to reduce or remove a shadow in the shadow region of the imitative simulation image; and
- responsive to detecting the glare region in the imitative simulation image, adjusting the glare region to reduce or remove a glare in the glare region of the imitative simulation image.

11. The system of claim 8, wherein
- the image content of the captured image depicts a real environment including the object;
- the simulation style associated with the environment simulator includes a simulated color and a simulated texture generated by the environment simulator; and
- to generate the imitative simulation image from the captured image, the first machine learning logic performs one or more operations including adjusting one or more of a captured color of the object and a captured texture of the object to one or more of the simulated color and the simulated texture.

12. The system of claim 8, wherein to generate the depth estimation image from the lighting-corrected image, the third machine learning logic performs one or more operations including:
- mapping one or more image pixels in the lighting-corrected image to one or more grayscale pixels in the depth estimation image.

13. The system of claim 8, wherein
- the first machine learning logic is a cycle-Generative Adversarial Network (GAN); and
- the second machine learning logic is a conditional-GAN and the third machine learning logic is another conditional-GAN.

* * * * *